United States Patent
Shi et al.

(10) Patent No.: US 11,013,048 B2
(45) Date of Patent: May 18, 2021

(54) MULTI-CONNECTIVITY COMMUNICATION METHOD AND DEVICE

(71) Applicant: HUAWEI TECHNOLOGIES CO., LTD., Shenzhen (CN)

(72) Inventors: Xiaoli Shi, Shanghai (CN); Hongzhuo Zhang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 68 days.

(21) Appl. No.: 16/234,684

(22) Filed: Dec. 28, 2018

(65) Prior Publication Data

US 2019/0200407 A1 Jun. 27, 2019

Related U.S. Application Data

(63) Continuation of application No. PCT/CN2016/100950, filed on Sep. 29, 2016.

(30) Foreign Application Priority Data

Jun. 30, 2016 (WO) ............... PCT/CN2016/088033

(51) Int. Cl.
*H04W 76/16* (2018.01)
*H04W 76/15* (2018.01)
(Continued)

(52) U.S. Cl.
CPC ....... *H04W 76/15* (2018.02); *H04W 28/0268* (2013.01); *H04W 28/065* (2013.01);
(Continued)

(58) Field of Classification Search
None
See application file for complete search history.

(56) References Cited

U.S. PATENT DOCUMENTS

| 2014/0192740 | A1 | 7/2014 | Ekpenyong et al. |
| 2015/0063295 | A1* | 3/2015 | Himayat ............ H04W 24/10 370/331 |

(Continued)

FOREIGN PATENT DOCUMENTS

| CN | 102984759 A | 3/2013 |
| CN | 103580778 A | 2/2014 |

(Continued)

OTHER PUBLICATIONS

Huawei: "Requirements and functionalities of the interface between LTE and NR", 3GPP Draft; R3-161138, vol. RAN WG3, No. Nanjing, China; May 23, 2016-May 27, 2016, May 22, 2016, XP051105942, 6 pages.

(Continued)

*Primary Examiner* — Bunjob Jaroenchonwanit
(74) *Attorney, Agent, or Firm* — Kilpatrick Townsend & Stockton LLP

(57) ABSTRACT

Embodiments of the present disclosure provide a multi-connectivity communication method and a device. An access network device of a first network determines to use an access network device of a second network to perform data splitting for data of UE, and then sends first splitting configuration information to the UE and sends second splitting configuration information to the access network device of the second network. The first splitting configuration information is used to notify the UE that the access network device of the second network is to split to-be-split data of the UE. The second splitting configuration information is used to instruct the access network device of the second network to split the to-be-split data of the UE.

27 Claims, 8 Drawing Sheets

(51) Int. Cl.
| | |
|---|---|
| *H04W 28/08* | (2009.01) |
| *H04W 28/10* | (2009.01) |
| *H04W 76/12* | (2018.01) |
| *H04W 28/02* | (2009.01) |
| *H04W 28/06* | (2009.01) |
| *H04W 40/02* | (2009.01) |
| *H04W 40/24* | (2009.01) |
| *H04W 40/34* | (2009.01) |
| *H04W 76/27* | (2018.01) |

(52) U.S. Cl.
CPC ........... *H04W 28/08* (2013.01); *H04W 28/10* (2013.01); *H04W 40/02* (2013.01); *H04W 40/248* (2013.01); *H04W 40/34* (2013.01); *H04W 76/12* (2018.02); *H04W 76/16* (2018.02); *H04W 76/27* (2018.02)

(56) References Cited

U.S. PATENT DOCUMENTS

| | | | |
|---|---|---|---|
| 2015/0133141 A1 | 5/2015 | Song et al. | |
| 2015/0201410 A1* | 7/2015 | Tang | H04W 76/16 370/329 |
| 2015/0215840 A1 | 7/2015 | Yiu et al. | |
| 2015/0245349 A1 | 8/2015 | Jha et al. | |
| 2015/0271836 A1* | 9/2015 | Damnjanovic | H04W 72/0413 370/329 |
| 2015/0326456 A1 | 11/2015 | Dudda et al. | |
| 2015/0333896 A1 | 11/2015 | Damnjanovic et al. | |
| 2015/0358866 A1 | 12/2015 | Xu et al. | |
| 2016/0050646 A1 | 2/2016 | Wang et al. | |
| 2016/0057658 A1* | 2/2016 | Horn | H04L 43/16 370/236 |
| 2016/0105864 A1* | 4/2016 | Guo | H04W 60/005 455/435.1 |
| 2016/0157117 A1* | 6/2016 | Pan | H04W 28/08 370/252 |
| 2016/0192266 A1 | 6/2016 | Dai et al. | |
| 2016/0255665 A1 | 9/2016 | Futaki | |
| 2016/0255672 A1* | 9/2016 | Uchino | H04L 5/0032 370/329 |
| 2016/0323790 A1* | 11/2016 | Wang | H04L 5/0053 |
| 2016/0337903 A1* | 11/2016 | Cheng | H04W 36/22 |
| 2017/0006603 A1 | 1/2017 | Chen et al. | |
| 2017/0055309 A1* | 2/2017 | Jha | H04W 16/14 |
| 2017/0079015 A1* | 3/2017 | Takahashi | H04W 28/0236 |
| 2017/0127315 A1* | 5/2017 | Chen | H04W 76/15 |
| 2017/0134998 A1 | 5/2017 | Xu et al. | |
| 2017/0196018 A1* | 7/2017 | Zeng | H04W 72/0426 |
| 2018/0035339 A1* | 2/2018 | Mitsui | H04W 72/04 |
| 2018/0035344 A1* | 2/2018 | Wang | H04W 36/0016 |
| 2018/0115926 A1* | 4/2018 | Wu | H04W 36/0027 |
| 2018/0124612 A1* | 5/2018 | Babaei | H04W 16/14 |
| 2018/0176839 A1* | 6/2018 | Ohara | H04W 16/32 |
| 2018/0227723 A1* | 8/2018 | Takahashi | H04W 4/24 |
| 2018/0255545 A1* | 9/2018 | Futaki | H04W 28/085 |
| 2018/0279403 A1 | 9/2018 | Kim | |
| 2019/0028935 A1* | 1/2019 | Cai | H04W 72/1284 |
| 2019/0075572 A1* | 3/2019 | Kato | H04W 16/32 |
| 2019/0098621 A1* | 3/2019 | Hong | H04W 72/1284 |
| 2019/0116629 A1* | 4/2019 | Hapsari | H04L 5/0035 |
| 2019/0132713 A1* | 5/2019 | Xu | H04M 15/65 |
| 2019/0320417 A1* | 10/2019 | Liu | H04W 76/11 |
| 2019/0380164 A1* | 12/2019 | Belghoul | H04W 28/08 |
| 2020/0059984 A1* | 2/2020 | Jeong | H04W 76/16 |
| 2020/0106663 A1* | 4/2020 | Yoo | H04L 41/0668 |

FOREIGN PATENT DOCUMENTS

| | | |
|---|---|---|
| CN | 104113881 A | 10/2014 |
| CN | 104349413 A | 2/2015 |
| CN | 104685920 A | 6/2015 |
| CN | 104797000 A | 7/2015 |
| CN | 104918329 A | 9/2015 |
| CN | 105144830 A | 12/2015 |
| CN | 105519167 A | 4/2016 |
| EP | 3065484 A1 | 9/2016 |
| EP | 2744260 B1 | 10/2017 |
| KR | 20130072529 A | 7/2013 |
| KR | 20160037212 A | 4/2016 |
| WO | 2015032043 A1 | 3/2015 |
| WO | 2015063963 A1 | 5/2015 |
| WO | 2015065010 A1 | 5/2015 |
| WO | 2017175816 A1 | 10/2017 |
| WO | 2018018409 A1 | 2/2018 |

OTHER PUBLICATIONS

3GPP TS 36.423 V13.2.0 (Dec. 2015),3rd Generation Partnership Project;Technical Specification Group Radio Access Network;Evolved Universal Terrestrial Radio Access Network(E-UTRAN);X2 application protocol (X2AP)(Release 13), total 230 pages.

3GPP, E-UTRA and E-UTRAN; Overall description; Stage 2 (Release 13), 3GPP TS 36.300 V13.2.0 (Dec. 2015), Jan. 13, 2016 (document indicating well-known technique),total 27 pages.

3GPP TSG-RAN WG2#94 R2-164306,NTT Docomo,Inc:"Summary of email discussion [93bis#23] [NR] Deployment scenarios",May 20, 2016, total 18 pages.

3GPP TSG-RAN WG2#94 R2-164094:"UP Protocol Architecture Aspects for Tight Integration of LTE and NR",May 14, 2016,total 5 pages.

3GPP TSG-RAN3 Meeting #92,R3-161138:"Requirements and functionalities of the interface between LTE and NR", Huawei, Nanjing, China, May 23-27, 2016, total 5 pages.

ZTE: "Discussion on the user plane for the tight interworking between NR and LTE", R2-163735, May 2016. 5 pages, XP051095719.

Xinwei, protocol architecture enhancement and bearer issues for uplink transmission in eLWA. 3GPP TSG RAN WG2 Meeting #94 Nanjing, china, May 23-27, 2016, R2-163667, 4 pages.

ZTE Corporation et al.,"Discussion on NextGen Working Planning to support parallel NSA-NR and SA-NR Development", 3GPP SA #72 SP-160350,Busan, South Korea, Jun. 2016,Total 9 Pages.

* cited by examiner

MULTI-CONNECTIVITY COMMUNICATION METHOD AND DEVICE

CROSS-REFERENCE TO RELATED APPLICATIONS

This application is a continuation of International Application No. PCT/CN2016/100950, filed on Sep. 29, 2016, which claims priority to International Application No. PCT/CN2016/088033, filed on Jun. 30, 2016. The disclosures of the aforementioned applications are hereby incorporated by reference in their entireties.

TECHNICAL FIELD

Embodiments of the present disclosure relate to communications technologies, and in particular, to a multi-connectivity communication method and a device.

BACKGROUND

With rapid development of user requirements and technologies, a fifth-generation mobile communications (5G) system is coming soon. The 5G system can provide a higher transmission rate than a Long Term Evolution (LTE) network. A theoretical maximum transmission rate in the 5G system can reach tens of gigabytes (Gb) per second. To increase a data transmission rate, the 5G system provides a multi-connectivity transmission method. User equipment (UE) can access the LTE network and the 5G system simultaneously, to transmit data of the UE simultaneously by using base stations of the LTE network and the 5G system. However, in an existing multi-connectivity solution, a data anchor is in an LTE network, to be specific, data splitting is performed by using a base station of the LTE network, and data is transmitted mainly by using the LTE network. Compared with transmitting data solely in an LTE network, the existing multi-connectivity solution can increase a data transmission rate, but cannot bring advantages of the data transmission rate in the 5G system into play.

SUMMARY

Embodiments of the present disclosure provide a multi-connectivity communication method and a device, to increase a throughput and a data transmission rate in a network.

A first aspect of the present disclosure provides a multi-connectivity communication method, including: determining, by an access network device of a first network, an access network device of a second network as an anchor for data splitting; then, sending first splitting configuration information to UE, where the first splitting configuration information is used to notify the UE that the access network device of the second network is to split to-be-split data of the UE; and sending second splitting configuration information to the access network device of the second network, where the second splitting configuration information is used to instruct the access network device of the second network to split the to-be-split data of the UE.

Optionally, the first splitting configuration information includes a radio resource configuration of the to-be-split data, and the radio resource configuration of the to-be-split data includes an identifier of a to-be-split bearer and media access control (MAC) configuration information. The second splitting configuration information includes the identifier of the to-be-split bearer and an identifier of the UE.

Optionally, the second splitting configuration information further includes at least one of information that is about a first tunnel endpoint and that is allocated by the access network device of the first network and traffic control information. The information about the first tunnel endpoint is used to indicate a destination of downlink data transmission, and the traffic control information is used to indicate maximum traffic that the access network device of the first network can bear when the access network device of the second network is performing data splitting.

Optionally, the first splitting configuration information is further used to instruct the UE to access the access network device of the first network. The sending, by the access network device of the first network, first splitting configuration information to UE is specifically: sending, by the access network device of the first network, the first splitting configuration information to the UE by using the access network device of the second network. Accordingly, the first splitting configuration information further includes mobility control information of the UE in the access network device of the first network. The mobility control information of the UE includes the identifier of the UE, configuration information for a random access channel RACH used by the UE to access the access network device of the first network, and an encryption algorithm used by the UE to communicate with the access network device of the first network. Optionally, the sending, by the access network device of the first network, second splitting configuration information to the access network device of the second network is specifically: sending, by the access network device of the first network, a splitting command to the access network device of the second network. The splitting command includes the second splitting configuration information.

Optionally, the sending, by the access network device of the first network, second splitting configuration information to the access network device of the second network is specifically: sending, by the access network device of the first network, a splitting request message to the access network device of the second network before sending the first splitting configuration information to the UE. The splitting request message includes an identifier of a selectable splitting bearer and the identifier of the UE, and the selectable splitting bearer includes at least the to-be-split bearer. Correspondingly, the sending, by the access network device of the first network, first splitting configuration information to UE is specifically: receiving, by the access network device of the first network, a splitting permission message sent by the access network device of the second network, where the splitting permission message includes the identifier of the to-be-split bearer, and the to-be-split bearer is a bearer allowed to be split and determined by the access network device of the second network from the selectable splitting bearer; and sending, by the access network device of the first network, the first splitting configuration information to the UE based on the splitting permission message.

A second aspect of the present disclosure provides a multi-connectivity communication method, including: receiving, by an access network device of a second network, second splitting configuration information sent by an access network device of a first network, where the second splitting configuration information is used to instruct the access network device of the second network to split to-be-split data of user equipment (UE); and splitting, by the access network device of the second network, the to-be-split data of the UE based on the second splitting configuration information.

Optionally, the second splitting configuration information includes an identifier of a to-be-split bearer and an identifier of the UE.

Optionally, the second splitting configuration information further includes at least one of information that is about a first tunnel endpoint and that is allocated by the access network device of the first network and traffic control information. The information about the first tunnel endpoint is used to indicate a destination of downlink data transmission, and the traffic control information is used to indicate maximum traffic that the access network device of the first network can bear when the access network device of the second network is performing data splitting.

Optionally, the receiving, by an access network device of a second network, second splitting configuration information sent by an access network device of a first network is specifically: receiving, by the access network device of the second network, a splitting command sent by the access network device of the first network. The splitting command includes the second splitting configuration information.

Optionally, the receiving, by an access network device of a second network, second splitting configuration information sent by an access network device of a first network is specifically: receiving, by the access network device of the second network, a splitting request message sent by the access network device of the first network. The splitting request message includes an identifier of a selectable splitting bearer and the identifier of the UE, and the selectable splitting bearer includes at least the to-be-split bearer.

Optionally, after the receiving, by the access network device of the second network, a splitting request message sent by the access network device of the first network, the method further includes: sending, by the access network device of the second network, a splitting permission message to the access network device of the first network. The splitting permission message includes the identifier of the to-be-split bearer, and the to-be-split bearer is a bearer allowed to be split and determined by the access network device of the second network from the selectable splitting bearer.

A third aspect of the present disclosure provides a multi-connectivity communication method, including: receiving, by UE, first splitting configuration information sent by an access network device of a first network, where the first splitting configuration information is used to notify the UE that an access network device of the second network is to split to-be-split data of the UE; and receiving or sending, by the UE, the to-be-split data based on the first splitting configuration information.

Optionally, the first splitting configuration information includes a radio resource configuration of the to-be-split data, and the radio resource configuration of the to-be-split data includes an identifier of a to-be-split bearer and MAC configuration information.

A fourth aspect of the present disclosure provides a multi-connectivity communication method, including: receiving, by UE, first splitting configuration information sent by an access network device of a first network, where the first splitting configuration information is used to notify the UE that an access network device of the second network is to split to-be-split data of the UE and used to instruct the UE to access the access network device of the first network; accessing, by the UE, the access network device of the first network based on the first splitting configuration information; and receiving or sending, by the UE, the to-be-split data based on the first splitting configuration information after the UE accesses the access network device of the first network.

Optionally, the first splitting configuration information includes a radio resource configuration of the to-be-split data and mobility control information of the UE in the access network device of the first network. The radio resource configuration of the to-be-split data includes an identifier of a to-be-split bearer and media access control (MAC) configuration information. The mobility control information of the UE includes an identifier of the UE, configuration information for a random access channel RACH used by the UE to access the access network device of the first network, and an encryption algorithm used by the UE to communicate with the access network device of the first network.

A fifth aspect of the present disclosure provides an access network device of a first network, including a determining module and a sending module. The determining module is configured to determine an access network device of a second network as an anchor for data splitting. The sending module is configured to send first splitting configuration information to UE. The first splitting configuration information is used to notify the UE that the access network device of the second network is to split to-be-split data of the UE. The sending module is further configured to send second splitting configuration information to the access network device of the second network. The second splitting configuration information is used to instruct the access network device of the second network to split the to-be-split data of the UE.

Optionally, the sending module is further configured to send a splitting request message to the access network device of the second network before sending the first splitting configuration information to the UE. The splitting request message includes an identifier of a selectable splitting bearer and an identifier of the UE, and the selectable splitting bearer includes at least a to-be-split bearer. Correspondingly, the access network device of the first network further includes a receiving module. The receiving module is configured to receive a splitting permission message sent by the access network device of the second network. The splitting permission message includes an identifier of the to-be-split bearer, and the to-be-split bearer is a bearer allowed to be split and determined by the access network device of the second network from the selectable splitting bearer. The sending module is specifically configured to send the first splitting configuration information to the UE based on the splitting permission message.

Optionally, the sending module is specifically configured to send a splitting command to the access network device of the second network. The splitting command includes the second splitting configuration information.

A sixth aspect of the present disclosure provides an access network device of a second network, including a receiving module and a splitting module. The receiving module is configured to receive second splitting configuration information sent by an access network device of a first network. The second splitting configuration information is used to instruct the access network device of the second network to split to-be-split data of user equipment (UE). The splitting module is configured to split the to-be-split data of the UE based on the second splitting configuration information.

Optionally, the receiving module is specifically configured to receive a splitting command sent by the access network device of the first network. The splitting command includes the second splitting configuration information.

Optionally, the receiving module is specifically configured to receive a splitting request message sent by the access network device of the first network. The splitting request message includes an identifier of a selectable splitting bearer and an identifier of the UE, and the selectable splitting bearer includes at least the to-be-split bearer. Correspondingly, the access network device of the second network further includes a sending module. The sending module is configured to send a splitting permission message to the access network device of the first network. The splitting permission message includes an identifier of the to-be-split bearer, and the to-be-split bearer is a bearer allowed to be split and determined by the access network device of the second network from the selectable splitting bearer.

A seventh aspect of the present disclosure provides UE, including a receiving module and a sending module. The receiving module is configured to receive first splitting configuration information sent by an access network device of a first network. The first splitting configuration information is used to notify the UE that an access network device of the second network is to split to-be-split data of the UE. The receiving module is further configured to receive the to-be-split data based on the first splitting configuration information. The sending module is configured to send the to-be-split data based on the first splitting configuration information.

An eighth aspect of the present disclosure provides UE, including a receiving module, an access module, and a sending module. The receiving module is configured to receive first splitting configuration information sent by an access network device of a first network. The first splitting configuration information is used to notify the UE that an access network device of the second network is to split to-be-split data of the UE and used to instruct the UE to access the access network device of the first network. The access module is configured to access the access network device of the first network based on the first splitting configuration information. The receiving module is further configured to receive the to-be-split data based on the first splitting configuration information after the UE accesses the access network device of the first network. The sending module is configured to send the to-be-split data based on the first splitting configuration information after the UE accesses the access network device of the first network.

A ninth aspect of the present disclosure provides an access network device of a first network, including a processor and a transmitter. The processor is configured to determine an access network device of a second network as an anchor for data splitting. The transmitter is configured to send first splitting configuration information to UE. The first splitting configuration information is used to notify the UE that the access network device of the second network is to split to-be-split data of the UE. The transmitter is further configured to send second splitting configuration information to the access network device of the second network. The second splitting configuration information is used to instruct the access network device of the second network to split the to-be-split data of the UE.

Optionally, the transmitter is specifically configured to send a splitting command to the access network device of the second network. The splitting command includes the second splitting configuration information.

Optionally, the transmitter is further configured to send a splitting request message to the access network device of the second network before sending the first splitting configuration information to the UE. The splitting request message includes an identifier of a selectable splitting bearer and an identifier of the UE, and the selectable splitting bearer includes at least the to-be-split bearer. Correspondingly, the access network device of the first network further includes a receiver. The receiver is configured to receive a splitting permission message sent by the access network device of the second network. The splitting permission message includes an identifier of the to-be-split bearer, and the to-be-split bearer is a bearer allowed to be split and determined by the access network device of the second network from the selectable splitting bearer. The transmitter is specifically configured to send the first splitting configuration information to the UE based on the splitting permission message.

A tenth aspect of the present disclosure provides an access network device of a second network, including a receiver and a processor. The receiver is configured to receive second splitting configuration information sent by an access network device of a first network. The second splitting configuration information is used to instruct the access network device of the second network to split to-be-split data of user equipment (UE). The processor is configured to split the to-be-split data of the UE based on the second splitting configuration information.

Optionally, the receiver is specifically configured to receive a splitting command sent by the access network device of the first network. The splitting command includes the second splitting configuration information.

Optionally, the receiver is specifically configured to receive a splitting request message sent by the access network device of the first network. The splitting request message includes an identifier of a selectable splitting bearer and an identifier of the UE, and the selectable splitting bearer includes at least the to-be-split bearer.

Optionally, the access network device of the second network further includes a transmitter. The transmitter is configured to send a splitting permission message to the access network device of the first network. The splitting permission message includes an identifier of the to-be-split bearer, and the to-be-split bearer is a bearer allowed to be split and determined by the access network device of the second network from the selectable splitting bearer.

An eleventh aspect of the present disclosure provides UE, including a receiver, a processor, and a transmitter. The receiver is configured to receive first splitting configuration information sent by an access network device of a first network. The first splitting configuration information is used to notify the UE that an access network device of the second network is to split to-be-split data of the UE. The processor is configured to control the receiver to receive the to-be-split data based on the first splitting configuration information. The processor is further configured to control the transmitter to send the to-be-split data based on the first splitting configuration information.

A twelfth aspect of the present disclosure provides UE, including a receiver, a processor, and a transmitter. The receiver is configured to receive first splitting configuration information sent by an access network device of a first network. The first splitting configuration information is used to notify the UE that an access network device of the second network is to split to-be-split data of the UE and used to instruct the UE to access the access network device of the first network. The processor is configured to access the access network device of the first network based on the first splitting configuration information. The receiver is further configured to receive the to-be-split data based on the first splitting configuration information. The transmitter is configured to send the to-be-split data based on the first splitting configuration information after the UE accesses the access network device of the first network.

It should be noted that, the device provided in the fifth to the twelfth aspects of the present disclosure may be configured to perform the methods corresponding to the first to the fourth aspects of the present disclosure. For content of the first splitting configuration information and the second splitting configuration information, refer to the methods in Embodiment 1 to Embodiment 4. Details are not described herein again.

A thirteenth aspect of the present disclosure provides a communications system. The communications system includes an access network device of a first network, an access network device of a second network, and UE. The access network device of the first network is configured to perform the method according to the first aspect of the present disclosure. The access network device of the second network is configured to perform the method according to the second aspect of the present disclosure. The UE is configured to perform the methods according to the third and the fourth aspects of the present disclosure.

A fourteenth aspect of the present disclosure provides a multi-connectivity communication method, including:

receiving, by an access network device of a first network, a splitting request message sent by an access network device of a second network, where the splitting request message includes identifiers of selectable splitting bearers;

sending, by the access network device of the first network, a splitting response message to the access network device of the second network, where the splitting response message includes an identifier of the to-be-split bearer, and the to-be-split bearer is some or all of the selectable splitting bearers; and sending, by the access network device of the first network, first splitting configuration information to user equipment (UE), where the first splitting configuration information is used to notify the UE that the access network device of the second network is to split the to-be-split bearer, and the first splitting configuration information includes the identifier of the to-be-split bearer.

Optionally, the sending, by the access network device of the first network, first splitting configuration information to UE includes:

sending, by the access network device of the first network, a radio resource control (RRC) reconfiguration message to the UE, where the RRC reconfiguration message includes the first splitting configuration information.

Optionally, after the sending, by the access network device of the first network, first splitting configuration information to UE, the method further includes:

sending, by the access network device of the first network, a splitting configuration complete message to the access network device of the second network.

A fifteenth aspect of the present disclosure provides a multi-connectivity communication method, including:

sending, by an access network device of a second network, a splitting request message to an access network device of a first network, where the splitting request message includes identifiers of selectable splitting bearers; and receiving, by the access network device of the second network, a splitting response message sent by the access network device of the first network, where the splitting response message includes an identifier of a to-be-split bearer, and the to-be-split bearer is some or all of the selectable splitting bearers.

Optionally, after the receiving, by the access network device of the second network, a splitting response message sent by the access network device of the first network, the method further includes:

receiving, by the access network device of the second network, a splitting configuration complete message sent by the access network device of the first network.

A sixteenth aspect of the present disclosure provides a multi-connectivity communication method, including:

receiving, by user equipment (UE), first splitting configuration information sent by an access network device of a first network, where the first splitting configuration information is used to notify the UE that an access network device of a second network is to split a to-be-split bearer, and the first splitting configuration information includes an identifier of the to-be-split bearer.

A seventeenth aspect of the present disclosure provides an access network device of a first network, including:

a receiving module, configured to receive a splitting request message sent by an access network device of a second network, where the splitting request message includes identifiers of selectable splitting bearers; and a sending module, configured to send a splitting response message to the access network device of the second network, where the splitting response message includes an identifier of the to-be-split bearer, and the to-be-split bearer is some or all of the selectable splitting bearers.

The sending module is further configured to send first splitting configuration information to user equipment (UE). The first splitting configuration information is used to notify the UE that the access network device of the second network is to split the to-be-split bearer, and the first splitting configuration information includes the identifier of the to-be-split bearer.

Optionally, the sending module is specifically configured to:

send a radio resource control (RRC) reconfiguration message to the UE, where the RRC reconfiguration message includes the first splitting configuration information.

Optionally, the sending module is further configured to:

send a splitting configuration complete message to the access network device of the second network.

An eighteenth aspect of the present disclosure provides an access network device of a second network, including:

a sending module, configured to send a splitting request message to an access network device of a first network, where the splitting request message includes identifiers of selectable splitting bearers; and a receiving module, configured to receive a splitting response message sent by the access network device of the first network, where the splitting response message includes an identifier of a to-be-split bearer, and the to-be-split bearer is some or all of the selectable splitting bearers.

Optionally, the receiving module is further configured to:

receive a splitting configuration complete message sent by the access network device of the first network.

A nineteenth aspect of the present disclosure provides UE, including:

a receiving module, configured to receive first splitting configuration information sent by an access network device of a first network, where the first splitting configuration information is used to notify the UE that an access network device of a second network is to split a to-be-split bearer, and the first splitting configuration information includes an identifier of the to-be-split bearer.

A twentieth aspect of the present disclosure provides an access network device of a first network, including a receiver, a transmitter, and a processor.

The processor is configured to control the receiver to receive a splitting request message sent by an access network device of a second network. The splitting request message includes identifiers of selectable splitting bearers.

The processor is further configured to control the transmitter to send a splitting response message to the access network device of the second network. The splitting response message includes an identifier of the to-be-split bearer, and the to-be-split bearer is some or all of the selectable splitting bearers.

The processor is further configured to control the transmitter to send first splitting configuration information to user equipment (UE). The first splitting configuration information is used to notify the UE that the access network device of the second network is to split the to-be-split bearer, and the first splitting configuration information includes the identifier of the to-be-split bearer.

Optionally, the transmitter is specifically configured to:
send a radio resource control (RRC) reconfiguration message to the UE, where the RRC reconfiguration message includes the first splitting configuration information.

Optionally, the processor is further configured to:
control the transmitter to send a splitting configuration complete message to the access network device of the second network.

A twenty-first aspect of the present disclosure provides an access network device of a second network, including a receiver, a transmitter, and a processor.

The processor is configured to control the transmitter to send a splitting request message to an access network device of a first network. The splitting request message includes identifiers of selectable splitting bearers.

The processor is further configured to control the receiver to receive a splitting response message sent by the access network device of the first network. The splitting response message includes an identifier of a to-be-split bearer, and the to-be-split bearer is some or all of the selectable splitting bearers.

Optionally, the processor is further configured to:
control the receiver to receive a splitting configuration complete message sent by the access network device of the first network.

A twenty-second aspect of the present disclosure provides UE, including a processor and a receiver.

The processor is configured to control the receiver to receive first splitting configuration information sent by an access network device of a first network. The first splitting configuration information is used to notify the UE that an access network device of a second network is to split a to-be-split bearer, and the first splitting configuration information includes an identifier of the to-be-split bearer.

In the fourteenth to the twenty-second aspects of the present disclosure, the splitting request message further includes one or more types of the following information: a splitting type, an identifier of the UE, quality of service (QoS) requirement information of the selectable splitting bearer, traffic control information, information about a second tunnel endpoint, report indication information of a throughput of the UE in the first network, and report indication information of a peak rate of the UE in the first network. The traffic control information is used to indicate maximum traffic that the access network device of the first network can bear when the access network device of the second network is performing data splitting, and the information about the second tunnel endpoint is used to indicate a destination of uplink data transmission.

In the fourteenth to the twenty-second aspects of the present disclosure, the splitting response message further includes one or more types of the following information: information about a first tunnel endpoint, a measurement result of the UE, the splitting type, the throughput of the UE in the first network, and the peak rate of the UE in the first network. The information about the first tunnel endpoint is used to indicate a destination of downlink data transmission.

In the fourteenth to the twenty-second aspects of the present disclosure, the first splitting configuration information further includes one or more types of the following information: media access control (MAC) configuration information and a splitting type.

According to the multi-connectivity communication method and the apparatus that are provided in the embodiments of the present disclosure, the access network device of the first network determines to use the access network device of the second network to perform data splitting for the data of the UE, and then sends the first splitting configuration information to the UE and the second splitting configuration information to the access network device of the second network. The first splitting configuration information is used to notify the UE that the access network device of the second network is to split the to-be-split data of the UE. The second splitting configuration information is used to instruct the access network device of the second network to split the to-be-split data of the UE. The access network device of the second network is used to split the data of the UE to the access network device of the first network and the access network device of the second network for simultaneous transmission, thereby improving transmission efficiency and increasing a throughput.

BRIEF DESCRIPTION OF DRAWINGS

To describe the technical solutions in the embodiments of the present disclosure or in the prior art more clearly, the following briefly describes the accompanying drawings required for describing the embodiments. Apparently, the accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

A multi-connectivity (multiple-connectivity) communication method provided in the embodiments of the present disclosure means that UE can access a first network and a second network simultaneously, and an access network device of the first network and an access network device of the second network can serve the UE simultaneously. The first network may be a currently existing network, such as an LTE network, a wireless fidelity (WiFi) network, a global system for mobile communications (GSM) network, a code division multiple access (CDMA) network, a wideband code division multiple access (WCDMA) network, or a new radio (New RAT or NR) access network. The second network may also be any one of the foregoing networks, but the first network and the second network are different. The new radio access network can provide a higher transmission rate than the LTE network. The new radio access network may also be referred to as a 5G network, a next generation network, or the like. An access network device of the new radio access network may also be referred to as an NR node or an NR BS (base station). This is not limited herein.

Multi-connectivity in the embodiments of the present disclosure specifically means that the UE accesses a core network of the first network by using the access network device of the first network, control plane (CP) data is transmitted in the first network, and user plane (UP) data is transmitted simultaneously over an air interface of the first network and an air interface of the second network. A user plane anchor performs splitting at a granularity of a data packet or a bearer at a packet data convergence protocol (PDCP) layer layer of the access network device of the second network.

Figure 1:
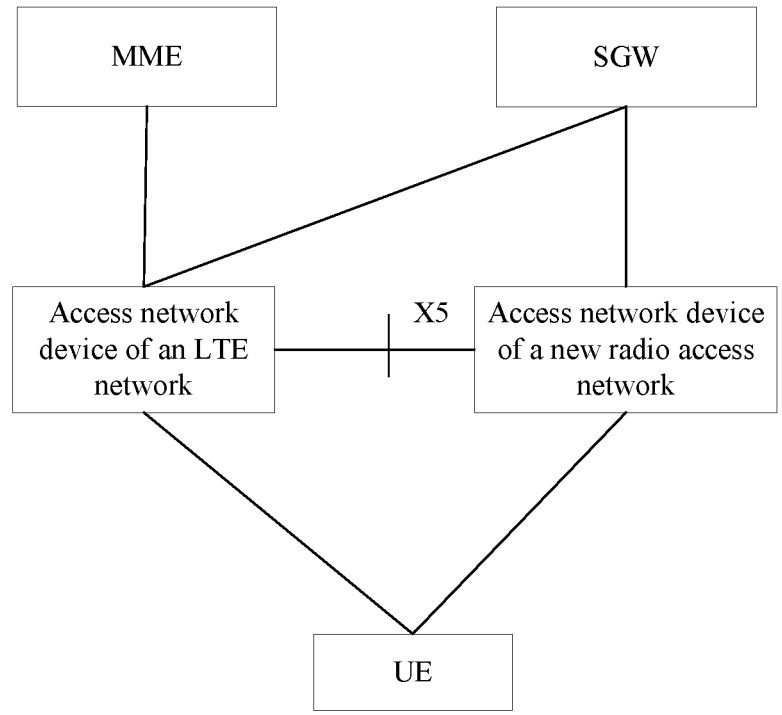
FIG. 1 is a schematic diagram of a network architecture to which an embodiment of the present disclosure is applicable.

For example, the first network is an LTE network, and the second network is a new radio access network. FIG. 1 is a schematic diagram of a network architecture to which an embodiment of the present disclosure is applicable. As shown in FIG. 1, the network architecture includes an access network device of the LTE network, an access network device of the new radio access network, and a core network device of the LTE network. The core network device of the LTE network includes a mobility management entity (MME) or a serving gateway (S-GW). The access network device of the new radio access network and the access network device of the LTE network have similar functions, and both can provide functions such as security authentication, charging, and mobility management for the UE. In the example in FIG. 1, the UE directly accesses a core network of the LTE network by using the access network device of the new radio access network. An interface between the access network device of the LTE network and the access network device of the new radio access network is a new interface. The new interface may be referred to an X5 interface or another name. This is not limited herein. In the example in FIG. 1, there are only two connections: a connection between the UE and the access network device of the new radio access network and a connection between the UE and the access network device of the new radio access network via the access network device of the LTE network. Certainly, the UE may also establish more connections by using the access network device of the LTE network. In the network structure shown in FIG. 1, the new radio access network has no core network, and the LTE network and the new radio access network share the core network of the LTE network. Certainly, the new radio access network may also have its own independent core network.

In the network architecture shown in FIG. 1, the access network device of the LTE network and the access network device of the new radio access network may be co-located or may not be co-located. The access network device of the LTE network and the access network device of the new radio access network may have an overlapping coverage area. A coverage area of the access network device of the LTE network is totally within a coverage area of the access network device of the new radio access network, or a coverage area of the access network device of the new radio access network is totally within a coverage area of the access network device of the LTE network. The access network device of the LTE network is also referred to as an evolved NodeB (eNB). The access network device of the LTE network includes an LTE macro base station, an LTE small cell, and the like. The access network device of the new radio access network also includes a macro base station, a small cell, and the like.

The method in the embodiments of the present disclosure is applicable to the following two scenarios: Scenario 1: Both a default bearer and a dedicated bearer are directly established between the access network device of the new radio access network and a core network device of the first network, and data splitting is directly performed by using the access network device of the new radio access network as an anchor for data splitting. Scenario 2: The core network device of the first network is first used as an anchor for data splitting to perform data splitting once; and when quality of an air interface of the new radio access network deteriorates, the access network device of the new radio access network is then used, based on the split data, as an anchor for data splitting to perform data splitting for the split data for a second time. In Scenario 1, data splitting is performed only once. In Scenario 2, data splitting are performed twice. In both the scenarios, a control plane is established in the first network.

Figure 2:
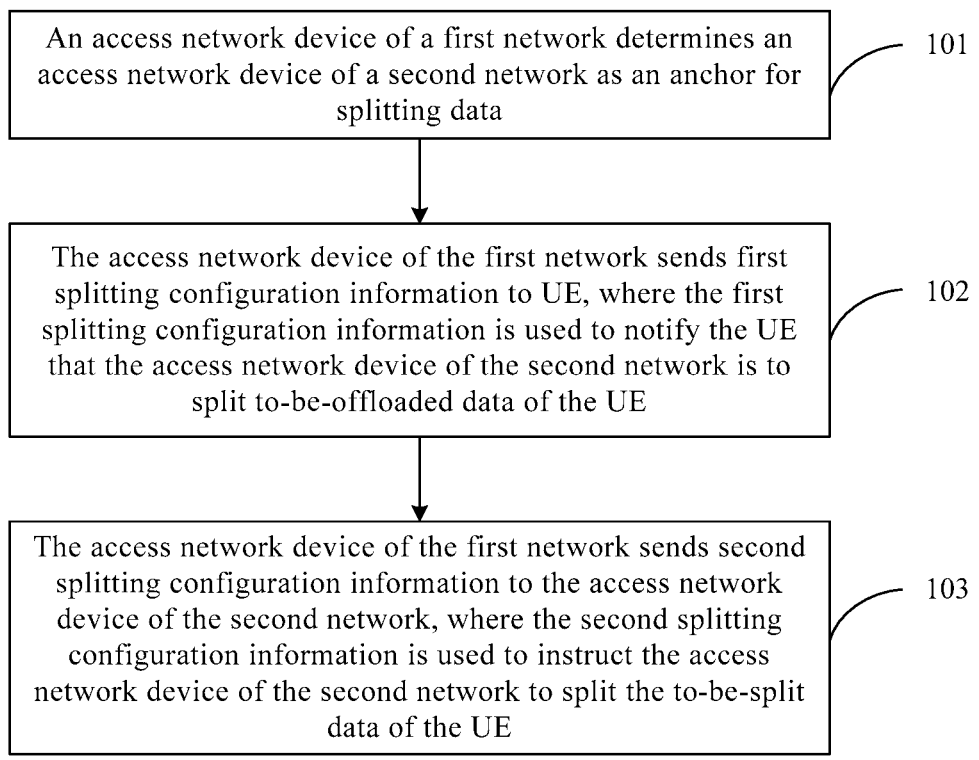
FIG. 2 is a flowchart of a multi-connectivity communication method according to Embodiment 1 of the present disclosure.

On the basis of the foregoing network architecture, Embodiment 1 of the present disclosure provides a multi-connectivity communication method. FIG. 2 is a flowchart of the multi-connectivity communication method according to Embodiment 1 of the present disclosure. As shown in FIG. 2, the method in this embodiment may include the following steps:

Step 101: An access network device of a first network determines an access network device of a second network as an anchor for data splitting.

Step 102: The access network device of the first network sends first splitting configuration information to UE, where the first splitting configuration information is used to notify the UE that the access network device of the second network is to split to-be-split data of the UE.

Step 103: The access network device of the first network sends second splitting configuration information to the access network device of the second network, where the second splitting configuration information is used to instruct the access network device of the second network to split the to-be-split data of the UE.

In this embodiment, the UE has separately accessed the access network device of the second network and the access network device of the first network. When the first network is an LTE network and the second network is a new radio access network, because the second network has no core network, the UE needs to access a core network of the first network by using the access network device of the first network. Therefore, the access network device of the first network can learn that the UE has separately established a connection to the two networks, and the access network device of the first network can obtain load, quality of service (QoS), a latency, and the like of the access network device of the second network by using an interface between the access network device of the first network and the access network device of the second network. In this case, the access network device of the first network may determine, based on the obtained load, QoS, latency, and the like of the access network device of the second network, that data splitting needs to be performed. For example, when the load of the access network device of the second network is greater than a preset first threshold, the access network device of the first network may determine the access network device of the second network as an anchor for data splitting, to reduce the load of the access network device of the second network, thereby implementing load balancing between the networks. Alternatively, when load of the access network device of the first network is less than a preset second threshold, the access network device of the first network determines the access network device of the second network as an anchor for data splitting, and actively shares the load of the access network device of the second network. The foregoing description is merely an example, and the access network device of the first network may alternatively determine the anchor for data splitting in another manner.

In step 102, the access network device of the first network sends the first splitting configuration information to the UE. The first splitting configuration information is used to notify the UE that the access network device of the second network is to split the to-be-split data of the UE. Specifically, the first splitting configuration information may include a radio resource configuration of the to-be-split data, and the radio resource configuration of the to-be-split data includes a to-be-split bearer list and media access control (MAC) configuration information. The to-be-split bearer list includes an identifier of a to-be-split bearer and a splitting type corresponding to the to-be-split bearer. Different bearers may correspond to different splitting types. The identifier of the to-be-split bearer may be a radio access bearer identifier (ERAB ID), a data radio bearer identifier (DRB ID), or a logical channel identifier (LCID). The MAC configuration information is used by the UE to perform MAC layer configuration.

Optionally, after receiving the first splitting configuration information, the UE may further return configuration complete indication information to the access network device of the first network, to notify the access network device of the first network that the UE has completed splitting configuration. Alternatively, the UE may not send configuration complete indication information to the access network device of the first network, and after sending the first splitting configuration information for a period of time, the access network device of the first network considers by default that the UE has completed configuration.

In step 103, the access network device of the first network sends the second splitting configuration information to the access network device of the second network, so that the access network device of the second network performs splitting configuration based on the second splitting configuration information. Specifically, the second splitting configuration information may include an identifier of the to-be-split bearer. Optionally, the second splitting configuration information may further include an identifier of the UE. The identifier of the to-be-split bearer included in the second splitting configuration information is the same as the identifier of the to-be-split bearer in the first splitting configuration information. After receiving the second splitting configuration information, the access network device of the second network determines which bearer of the UE is to be split. Specifically, the identifier of the UE may be a cell radio network temporary identifier (C-RNTI), an international mobile subscriber identification number (IMSI), or the like allocated by an eNB.

Optionally, when a general packet radio service (GPRS) tunneling protocol for a user plane (GTP-U) is used for a splitting channel between the access network device of the second network and the access network device of the first network, the second splitting configuration information further includes information that is about a first tunnel endpoint and that is allocated by the access network device of the first network. The information about the first tunnel endpoint is used to indicate a destination of downlink data transmission. Specifically, the information about the first tunnel endpoint includes a tunnel endpoint identifier (TEID) and a first transport layer address. A first tunnel endpoint and a to-be-split bearer are in a one-to-one correspondence. Each to-be-split bearer corresponds to one first tunnel endpoint, and when there are a plurality of to-be-split bearers, there are a plurality of first tunnel endpoints.

Optionally, the second splitting configuration information may further include traffic control information. The traffic control information is used to control maximum traffic that the access network device of the first network can bear when the access network device of the second network is performing data splitting, thereby avoiding excessively large or small traffic being split. If the access network device of the second network splits an excessively large quantity of data to the access network device of the first network for transmission, a decrease in a throughput of an entire network is caused due to a relatively low transmission rate of the access network device of the first network.

It should be noted that, there is no order of performing step 102 and step 103 in this embodiment. To be specific, the access network device of the first network may first send the first splitting configuration information to the UE and then send the second splitting configuration information to the access network device of the second network. Alternatively, the access network device of the first network first sends the second splitting configuration information to the access network device of the second network and then sends the first splitting configuration information to the UE. In addition, the access network device of the first network may use a newly defined message to send the first splitting configuration information and the second splitting configuration information, or may use an existing message to send the first splitting configuration information and the second splitting configuration information. This is not limited. For example, the first network may reuse an existing RRC connection reconfiguration message, and send the first splitting configuration information to the UE by adding the first splitting configuration information to the RRC connection reconfiguration message.

In this embodiment, the anchor for data splitting is the access network device of the second network. The access network device of the second network may split uplink data and downlink data of the UE after receiving the second splitting configuration information. The data splitting means that some data packets on a same bearer are transmitted over an air interface of the access network device of the first network, and the other data packets on the bearer are transmitted over an air interface of the access network device of the second network.

The downlink data is used as an example. When the core network has downlink data to be sent to the UE, the access network device of the second network determines a bearer of the to-be-sent downlink data, and then determines, based on the second splitting configuration information, whether the bearer of the to-be-sent downlink data needs to be split. If the bearer of the to-be-sent downlink data needs to be split, the access network device of the second network directly sends some data packets in the to-be-sent downlink data to the UE according to a preset splitting rule, and sends the other data packets in the to-be-sent downlink data to the access network device of the first network, and then the other data packets are sent to the UE by using the access network device of the first network. In this way, downlink data packets received by the UE come from both the access network device of the first network and the access network device of the second network. Then, the UE combines data of a same bearer that is received from the access network device of the first network and the access network device of the second network. The splitting rule may be determined by the access network device of the second network, or may be sent by the access network device of the first network to the access network device of the second network. Specifically, the splitting rule is, for example, allocating data packets in a same data stream evenly to the access network devices of the two networks for transmission, or may be performing splitting according to a specific splitting proportion. The splitting proportion may be determined based on a transmission rate of a network. For example, when a transmission rate of the access network device of the second network is higher than a transmission rate of the access network device of the first network, the access network device of the second network splits a larger proportion of data, and the access network device of the first network splits a smaller proportion of data.

In this embodiment, the access network device of the first network determines the access network device of the second network as the anchor for data splitting, then sends the first splitting configuration information to the UE, to notify the UE that the access network device of the second network is to split the to-be-split data of the UE, and sends the second splitting configuration information to the access network device of the second network, to instruct the access network device of the second network to split the to-be-split data of the UE. The access network device of the second network splits the to-be-split data of the UE based on the second splitting configuration information. The access network device of the second network is used to split the data of the UE to the access network device of the first network and the access network device of the second network for simultaneous transmission, thereby improving transmission efficiency and increasing a throughput.

When the anchor for data splitting is the access network device of the new radio access network, most data is transmitted by using the new radio access network, and only some split data is transmitted by using the first network. Because the transmission rate of the new radio access network is higher, compared with a case in which the anchor for data splitting is in the first network or the data is directly transmitted in the new radio access network, transmission efficiency can be further improved and a throughput can be increased.

Figure 3:
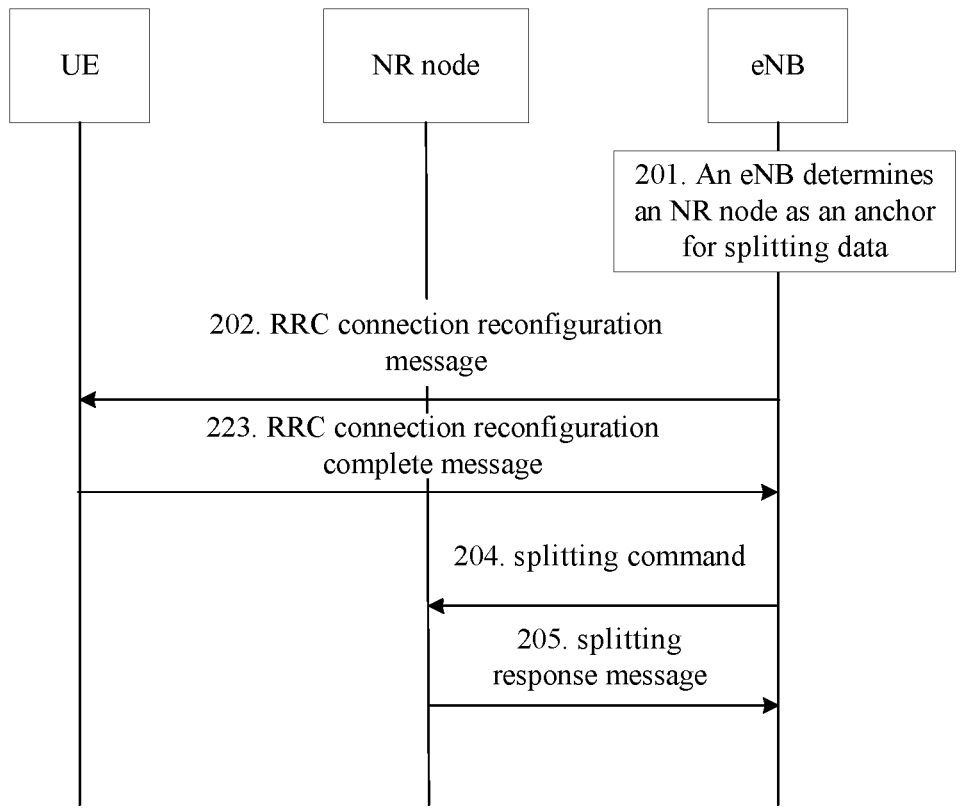
FIG. 3 is a signaling flowchart of a multi-connectivity communication method according to Embodiment 2 of the present disclosure.
Figure 4:
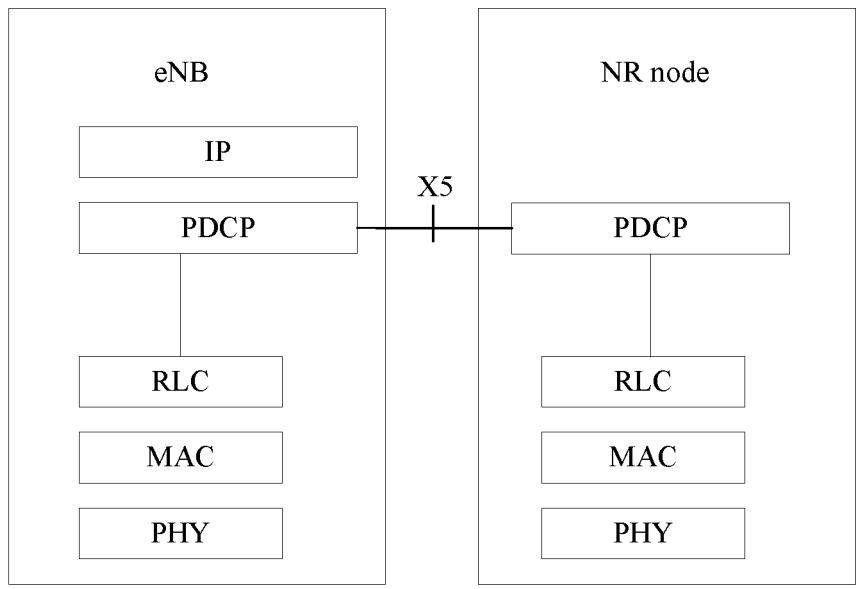
FIG. 4 is a schematic diagram of user plane protocol stacks of an eNB and an NR node.
Figure 5:
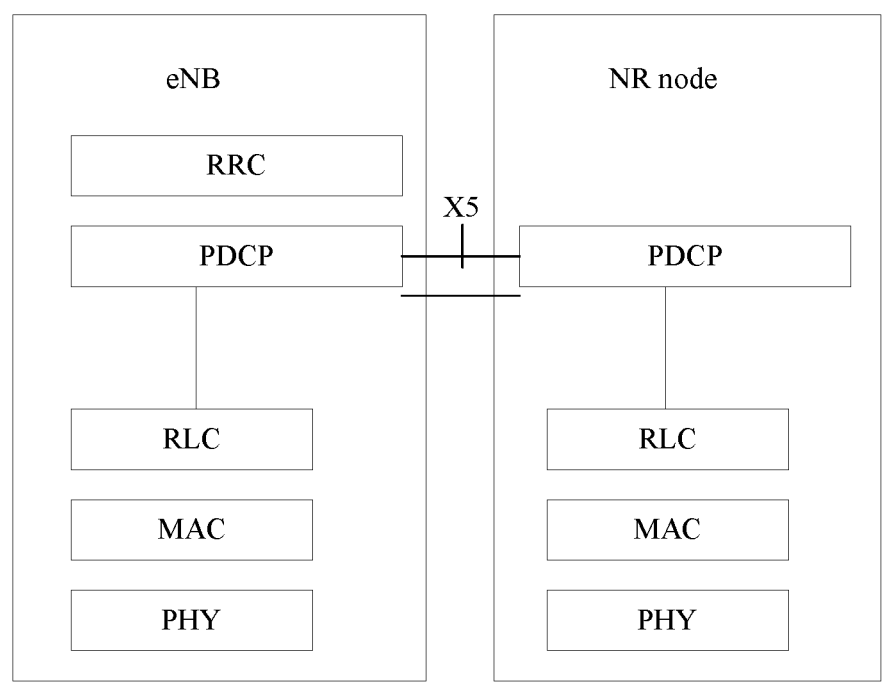
FIG. 5 is a schematic diagram of control plane protocol stacks of an eNB and an NR node.

On the basis of Embodiment 1, Embodiment 2 of the present disclosure provides a multi-connectivity communication method. This embodiment is described by using an example in which a first network is an LTE network and a second network is a new radio access network. FIG. 3 is a signaling flowchart of the multi-connectivity communication method provided in Embodiment 2 of the present disclosure. FIG. 4 is a schematic diagram of user plane protocol stacks of an eNB and an NR node. As shown in FIG. 4, the user plane protocol stack of the eNB includes five layers: an IP layer, a PDCP layer, an RLC layer, a MAC layer, and a PHY layer. The user plane protocol stack of the NR node includes four layers: a PDCP layer, an RLC layer, a MAC layer, and a PHY layer. FIG. 5 is a schematic diagram of control plane protocol stacks of an eNB and an NR node. As shown in FIG. 5, the control plane protocol stack of the eNB includes five layers: an RRC layer, a PDCP layer, an RLC layer, a MAC layer, and a PHY layer. The control plane protocol stack of the NR node may include four layers: a PDCP layer, an RLC layer, a MAC layer, and a PHY layer. In addition, the control plane protocol stack of the NR node may further include an RRC layer. Referring to FIG. 3 to FIG. 5, the method in this embodiment may include the following steps.

Step 201: The eNB determines the NR node as an anchor for data splitting.

Step 202: The eNB sends an RRC connection reconfiguration message to UE, where the RRC connection reconfiguration message includes first splitting configuration information.

The first splitting configuration information is used to notify the UE that an access network device of the second network is to split to-be-split data of the UE. The first splitting configuration information may specifically include a radio resource configuration of the to-be-split data. The radio resource configuration of the to-be-split data includes a to-be-split bearer list and MAC configuration information.

The to-be-split bearer list includes an identifier of a to-be-split bearer and a splitting type corresponding to the to-be-split bearer. Different bearers may correspond to different splitting types. The splitting type may be an existing type or a type newly defined in the present disclosure. In this embodiment, a splitting type with the NR node being the anchor for data splitting is defined, and may be referred to as a secondary cell group (SCG) split bearer type. A name of the newly defined splitting type is not limited in the present disclosure.

In this embodiment, the eNB may send the first splitting configuration information to the UE by adding the first splitting configuration information to the RRC connection reconfiguration message. Certainly, the eNB may alternatively send the splitting configuration information to the UE by using another existing message or a newly defined message.

Step 203: The UE sends an RRC connection reconfiguration complete message to the eNB.

After completing splitting configuration based on the first splitting configuration information, the UE sends an RRC connection reconfiguration complete message to the eNB. After receiving the RRC connection reconfiguration complete message, the eNB determines that the UE has completed configuration. Optionally, the RRC connection reconfiguration complete message may further include configuration complete indication information. For example, 1-bit indication information is used to indicate that the configuration is completed. After receiving the RRC connection reconfiguration complete message, the eNB determines, based on the configuration complete indication information, that the UE has completed the configuration.

Step 204: The eNB sends a splitting command (or a split bearer command) to the NR node, where the splitting command includes second splitting configuration information.

The second splitting configuration information includes the identifier of the to-be-split bearer. Optionally, the second splitting configuration information further includes an identifier of the UE.

Optionally, when a GTP-U protocol is used as a user plane transport protocol between the eNB and the NR node, the second splitting configuration information further includes information that is about a first tunnel endpoint and that is allocated by the eNB. The information about the first tunnel endpoint includes a tunnel endpoint identifier and a first transport layer address. The information about the first tunnel endpoint is used to indicate a destination of data transmission in a downlink data transmission path. A first tunnel endpoint and a to-be-split bearer are in a one-to-one correspondence. Each to-be-split bearer corresponds to one first tunnel endpoint, and when there are a plurality of to-be-split bearers, there are a plurality of first tunnel endpoints. Further, the second splitting configuration information may further include traffic control information.

In this embodiment, the splitting command is used to instruct the NR node to split the to-be-split data of the UE. Optionally, the splitting command may further include splitting indication information. The eNB explicitly instructs, by using the splitting indication information, the NR node to split the data of the UE. Alternatively, the eNB implicitly instructs, by using the second splitting configuration information, the NR node to split the data of the UE.

Step 205: The NR node sends a splitting response message to the eNB.

Optionally, the splitting response message includes information about a bearer for which splitting has been confirmed, and optionally, further includes information that is about a second tunnel endpoint and that is allocated by the NR node. The information about the second tunnel endpoint is used to indicate a destination of data transmission in an uplink data transmission path. The information about the second tunnel endpoint includes an identifier of the second tunnel endpoint and a second transport layer address. The information about the second tunnel endpoint is mainly used in a data forwarding scenario. To be specific, when not all downlink data that is split to the eNB is sent to the UE, the eNB may use the identifier of the second tunnel endpoint allocated by the NR node to send remaining downlink data to the NR node. A second tunnel endpoint and a to-be-split bearer are in a one-to-one correspondence. Each to-be-split bearer corresponds to one second tunnel endpoint. When there are a plurality of to-be-split bearers, there are a plurality of second tunnel endpoints.

Figure 6:
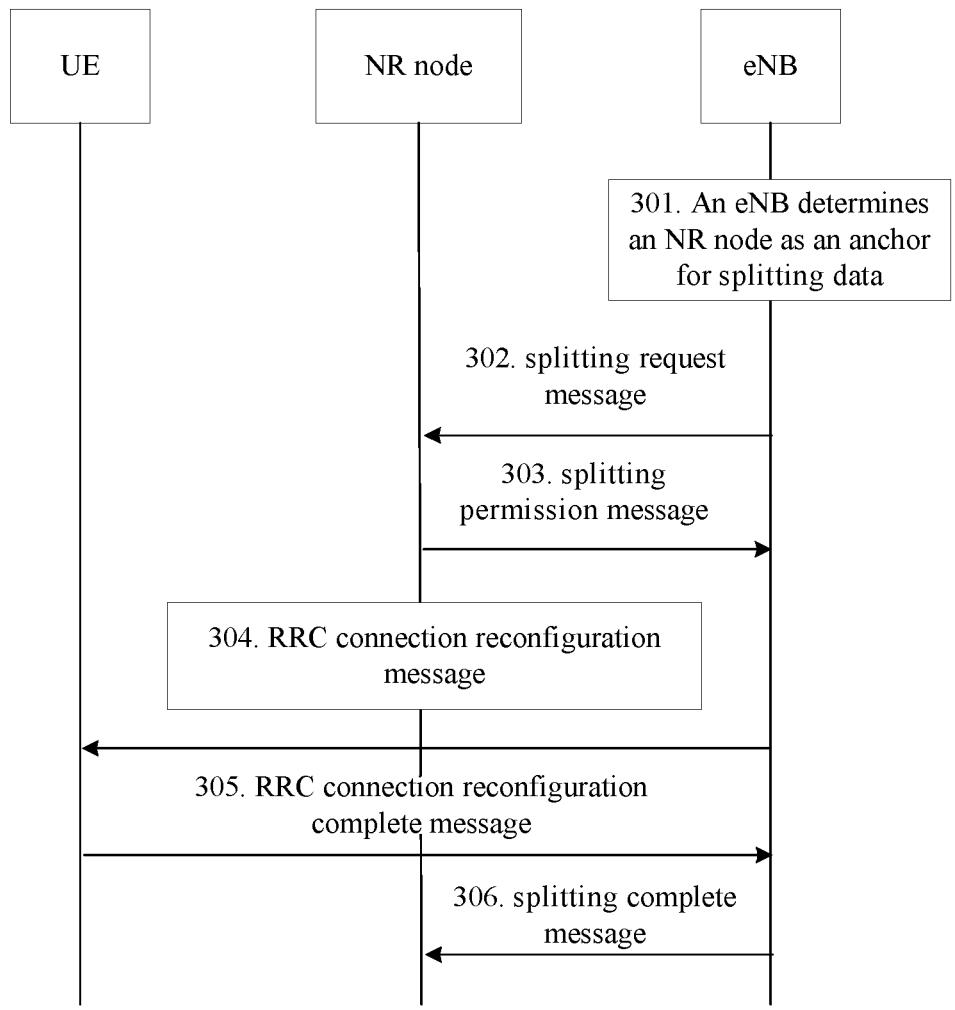
FIG. 6 is a signaling flowchart of a multi-connectivity communication method according to Embodiment 3 of the present disclosure.

FIG. 6 is a signaling flowchart of a multi-connectivity communication method according to Embodiment 3 of the present disclosure. This embodiment is described by using an example in which a first network is an LTE network and a second network is a new radio access network. In this embodiment, user plane protocol stacks and control plane protocol stacks of an eNB and an NR node are shown in FIG. 4 and FIG. 5, and are not described herein again. A difference between this embodiment and Embodiment 2 lies in that, in this embodiment, the NR node determines which bearer is to be split, while in Embodiment 2, the eNB determines which bearer is to be split. Referring to FIG. 6, the method in this embodiment may include the following steps.

Step 301: The eNB determines the NR node as an anchor for data splitting.

Step 302: The eNB sends a splitting request message to the NR node, where the splitting request message includes an identifier of a selectable splitting bearer, and the selectable splitting bearer includes at least a to-be-split bearer. Optionally, the splitting request message further includes an identifier of UE.

In this embodiment, the eNB sends the identifier of the selectable splitting bearer and the identifier of the UE to the NR node, to request the NR node to allow splitting. There may be one or more selectable splitting bearers. The NR node determines whether to allow the bearers to be split. The NR node may allow splitting all or only some bearers in the selectable splitting bearers. The identifier of the UE may be a C-RNTI, an IMSI, or the like allocated by the eNB.

Optionally, when a GTP-U protocol is used as a user plane transport protocol between the eNB and the NR node, second splitting configuration information includes information that is about a first tunnel endpoint and that is allocated by the eNB. The information about the first tunnel endpoint includes an identifier of the first tunnel endpoint and a first transport layer address. The information about the first tunnel endpoint is used to indicate a destination of downlink data transmission. A first tunnel endpoint and a to-be-split bearer are in a one-to-one correspondence. Further, the second splitting configuration information may further include traffic control information.

Step 303: The NR node sends a splitting permission message to the eNB, where the splitting permission message includes an identifier of the to-be-split bearer, and the to-be-split bearer is a bearer allowed to be split and determined by the access network device of the new radio access network from the selectable splitting bearer.

If the NR node allows splitting all the selectable splitting bearers requested by the eNB, identifiers of to-be-split bearers included in the splitting permission message are identifiers of all the selectable splitting bearers. If the NR node allows splitting some of the selectable splitting bearers requested by the eNB, identifiers of to-be-split bearers included in the splitting permission message are identifiers of the bearers that are allowed to be split. There may be one or more to-be-split bearers.

Optionally, the splitting permission message further includes information that is about a second tunnel endpoint and that is allocated by the NR node. The information about the second tunnel endpoint is used to indicate a destination of data transmission in an uplink data transmission path. The information about the second tunnel endpoint includes an identifier of the second tunnel endpoint and a second transport layer address. The information about the second tunnel endpoint is mainly used in a data forwarding scenario. To be specific, when not all downlink data that is split to the eNB is sent to the UE, the eNB may use the information about the second tunnel endpoint that is allocated by the NR node to send remaining downlink data to the NR node. A second tunnel endpoint and a to-be-split bearer are in a one-to-one correspondence.

When the NR node allows splitting some of the selectable splitting bearers requested by the eNB, the splitting permission message further includes an identifier of a bearer that is not allowed to be split. For the bearer that is not allowed to be split, the NR node performs transmission according to a normal transmission procedure. There may be one or more bearers that are not allowed to be split.

Step 304: The eNB sends an RRC connection reconfiguration message to the UE, where the RRC connection reconfiguration message includes first splitting configuration information.

The first splitting configuration information is used to notify the UE that the access network device of the second network is to split to-be-split data of the UE. The first splitting configuration information may specifically include a radio resource configuration of the to-be-split data. The radio resource configuration of the to-be-split data includes a to-be-split bearer list and MAC configuration information. The to-be-split bearer list includes an identifier of the to-be-split bearer and a splitting type corresponding to the to-be-split bearer. Different bearers may correspond to different splitting types.

Step 305: The UE sends an RRC connection reconfiguration complete message to the eNB.

After completing splitting configuration based on the first splitting configuration information, the UE sends the RRC connection reconfiguration complete message to the eNB. After receiving the RRC connection reconfiguration complete message, the eNB determines that the UE has completed the configuration. Optionally, the RRC connection reconfiguration complete message may further include configuration complete indication information. After receiving the RRC connection reconfiguration complete message, the eNB determines, based on the configuration complete indication information, that the UE has completed the configuration.

Step 306: The eNB sends a splitting complete message to the NR node.

The splitting complete message is used to instruct the NR node to split the data of the UE. Optionally, the splitting complete message includes splitting indication information. The eNB instructs, by using the splitting indication information, the NR node to split the data of the UE.

In this embodiment, when there is a data splitting requirement, the eNB first requests the NR node to perform data splitting, and sends the identifier of the selectable splitting bearer and the identifier of the UE to the NR node. The NR node determines, based on the identifier of the selectable splitting bearer and the identifier of the UE, for which bearer data splitting is allowed. For example, the NR node determines, based on its own load status, whether to allow splitting. If some or all of the selectable splitting bearers are allowed to be split, the NR node sends a splitting permission message to the eNB. If no bearer is allowed to be split, the NR node sends a splitting rejected message to the eNB. If the eNB receives the splitting permission message sent by the NR node, the eNB determines, based on the splitting permission message, that the NR node allows splitting. The eNB sends the RRC reconfiguration message to the UE. If the eNB receives the splitting rejected message sent by the NR node, the eNB does not send the RRC reconfiguration message to the UE.

Embodiment 4 of the present disclosure provides a multi-connectivity communication method. A difference between the method in this embodiment and those in Embodiment 1 to Embodiment 3 lies in that, in this embodiment, before an access network device of a first network determines an access network device of a second network as an anchor for data splitting, UE accesses only the access network device of the second network, without accessing the access network device of the first network. Therefore, in this embodiment, first splitting configuration information is not only used to notify the UE that the access network device of the second network is to split to-be-split data of the UE, but also used to instruct the UE to access the access network device of the first network. Because the UE has not yet accessed the access network device of the first network, the access network device of the first network cannot directly send the first splitting configuration information to the UE. Instead, the access network device of the first network can send the first splitting configuration information to the UE only by using the access network device of the second network. In other words, the access network device of the first network sends the first splitting configuration information to the access network device of the second network, and the access network device of the second network forwards the first splitting configuration information to the UE.

Accordingly, the first splitting configuration information further includes mobility control information of the UE in the access network device of the first network. The mobility control information of the UE includes an identifier of the UE, configuration information for a random access channel (RACH) used by the UE to access the access network device of the first network, and an encryption algorithm used by the UE to communicate with the access network device of the first network. The RACH configuration information is used by the UE to access the access network device of the first network. The encryption algorithm is used by the UE to generate a key, and use the key and keys that are of a signaling plane and a user plane and that are derived from the key to perform encryption and integrity protection of the signaling plane and a data plane between the UE and the first network.

After receiving the first splitting configuration information, the UE accesses the access network device of the first network based on the RACH configuration information that is used by the UE to access the access network device of the first network and that is included in the first splitting configuration information. After the UE accesses the access network device of the first network, the access network device of the second network may start to split the to-be-split data of the UE. To be specific, the UE receives data on a same to-be-split bearer separately from the access network device of the first network and the access network device of the second network, and then combines the data.

Figure 7:
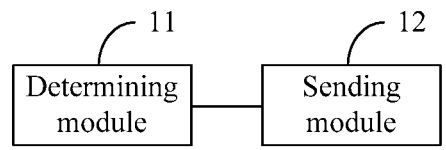
FIG. 7 is a schematic structural diagram of an access network device of a first network according to Embodiment 5 of the present disclosure.

FIG. 7 is a schematic structural diagram of an access network device of a first network according to Embodiment 5 of the present disclosure. As shown in FIG. 7, the access network device of the first network in this embodiment includes a determining module 11 and a sending module 12.

The determining module 11 is configured to determine an access network device of a second network as an anchor for data splitting.

The sending module 12 is configured to send first splitting configuration information to UE. The first splitting configuration information is used to notify the UE that the access network device of the second network is to split to-be-split data of the UE.

The sending module 12 is further configured to send second splitting configuration information to the access network device of the second network. The second splitting configuration information is used to instruct the access network device of the second network to split the to-be-split data of the UE.

Optionally, the first splitting configuration information includes a radio resource configuration of the to-be-split data, and the radio resource configuration of the to-be-split data includes an identifier of a to-be-split bearer and media access control (MAC) configuration information. The second splitting configuration information includes the identifier of the to-be-split bearer and an identifier of the UE.

Optionally, the second splitting configuration information further includes at least one of information that is about a first tunnel endpoint and that is allocated by the access network device of the first network and traffic control information. The information about the first tunnel endpoint is used to indicate a destination of downlink data transmission, and the traffic control information is used to indicate maximum traffic that the access network device of the first network can bear when the access network device of the second network is performing data splitting.

Optionally, the sending module 12 is further configured to send a splitting request message to the access network device of the second network before sending the first splitting configuration information to the UE. The splitting request message includes an identifier of a selectable splitting bearer and the identifier of the UE, and the selectable splitting bearer includes at least the to-be-split bearer. Correspondingly, the access network device of the first network further includes a receiving module (not shown in FIG. 7). The receiving module is configured to receive a splitting permission message sent by the access network device of the second network. The splitting permission message includes the identifier of the to-be-split bearer, and the to-be-split bearer is a bearer allowed to be split and determined by the access network device of the second network from the selectable splitting bearer. The sending module 12 is specifically configured to send the first splitting configuration information to the UE based on the splitting permission message.

Optionally, the sending module 12 is specifically configured to send a splitting command to the access network device of the second network. The splitting command includes the second splitting configuration information.

Optionally, the first splitting configuration information is further used to instruct the UE to access the access network device of the first network. The sending, by the access network device of the first network, first splitting configuration information to UE is specifically: sending, by the access network device of the first network, the first splitting configuration information to the UE by using the access network device of the second network. Accordingly, the first splitting configuration information further includes mobility control information of the UE in the access network device of the first network. The mobility control information of the UE includes the identifier of the UE, configuration information for a random access channel RACH used by the UE to access the access network device of the first network, and an encryption algorithm used by the UE to communicate with the access network device of the first network.

It should be noted that, alternatively, the sending module 12 in this embodiment may be implemented by two functional units: a first sending module and a second sending module. The first sending module is configured to send data to the UE. The second sending module is configured to send data to the access network device of the second network. When the first network is an LTE network and the second network is a new radio access network, the second sending module externally presents an X5 interface. The X5 interface is an interface newly added between the access network device of the LTE network and the access network device of the new radio access network. In addition, the first sending module and the second sending module may be implemented by two physical units. Certainly, the first sending module and the second sending module may alternatively be implemented by one physical unit. This is not limited herein.

Figure 8:
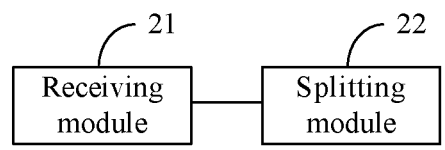
FIG. 8 is a schematic structural diagram of an access network device of a second network according to Embodiment 6 of the present disclosure.

FIG. 8 is a schematic structural diagram of an access network device of a second network according to Embodiment 6 of the present disclosure. As shown in FIG. 8, the access network device of the second network provided in this embodiment includes a receiving module 21 and a splitting module 22.

The receiving module 21 is configured to receive second splitting configuration information sent by an access network device of a first network. The second splitting configuration information is used to instruct the access network device of the second network to split to-be-split data of user equipment (UE).

The splitting module 22 is configured to split the to-be-split data of the UE based on the second splitting configuration information.

The second splitting configuration information includes an identifier of a to-be-split bearer and an identifier of the UE.

Optionally, the second splitting configuration information further includes at least one of information that is about a first tunnel endpoint and that is allocated by the access network device of the first network and traffic control information. The information about the first tunnel endpoint is used to indicate a destination of downlink data transmission, and the traffic control information is used to indicate maximum traffic that the access network device of the first network can bear when the access network device of the second network is performing data splitting.

Optionally, the receiving module 21 is specifically configured to receive a splitting command sent by the access network device of the first network. The splitting command includes the second splitting configuration information.

Optionally, the receiving module 21 is specifically configured to receive a splitting request message sent by the access network device of the first network. The splitting request message includes an identifier of a selectable splitting bearer and the identifier of the UE, and the selectable splitting bearer includes at least the to-be-split bearer. Correspondingly, the access network device of the second network further includes a sending module (not shown in FIG. 8). The sending module is configured to send a splitting permission message to the access network device of the first network. The splitting permission message includes the identifier of the to-be-split bearer, and the to-be-split bearer is a bearer allowed to be split and determined by the access network device of the second network from the selectable splitting bearer.

Figure 9:
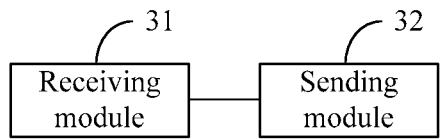
FIG. 9 is a schematic structural diagram of UE according to Embodiment 7 of the present disclosure.

FIG. 9 is a schematic structural diagram of UE according to Embodiment 7 of the present disclosure. As shown in FIG. 9, the UE provided in this embodiment includes a receiving module 31 and a sending module 32.

The receiving module 31 is configured to receive first splitting configuration information sent by an access network device of a first network. The first splitting configuration information is used to notify the UE that an access network device of the second network is to split to-be-split data of the UE.

The receiving module 31 is further configured to receive the to-be-split data based on the first splitting configuration information.

The sending module 32 is configured to send the to-be-split data based on the first splitting configuration information.

Optionally, the first splitting configuration information includes a radio resource configuration of the to-be-split data, and the radio resource configuration of the to-be-split data includes an identifier of a to-be-split bearer and media access control (MAC) configuration information.

Figure 10:
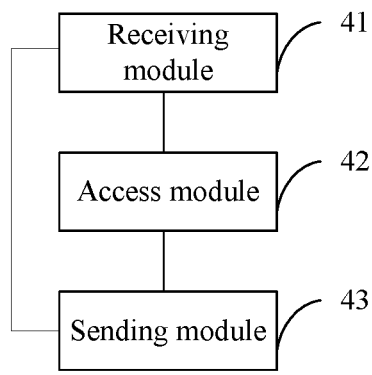
FIG. 10 is a schematic structural diagram of UE according to Embodiment 8 of the present disclosure.

FIG. 10 is a schematic structural diagram of UE according to Embodiment 8 of the present disclosure. As shown in FIG. 10, the UE provided in this embodiment includes a receiving module 41, an access module 42, and a sending module 43.

The receiving module 41 is configured to receive first splitting configuration information sent by an access network device of a first network. The first splitting configuration information is used to notify the UE that an access network device of the second network is to split to-be-split data of the UE and used to instruct the UE to access the access network device of the first network.

The access module 42 is configured to access the access network device of the first network based on the first splitting configuration information.

The receiving module 41 is further configured to receive the to-be-split data based on the first splitting configuration information after the UE accesses the access network device of the first network.

The sending module 43 is configured to send the to-be-split data based on the first splitting configuration information after the UE accesses the access network device of the first network.

Optionally, the first splitting configuration information includes a radio resource configuration of the to-be-split data and mobility control information of the UE in the access network device of the first network. The radio resource configuration of the to-be-split data includes an identifier of a to-be-split bearer and media access control (MAC) configuration information. The mobility control information of the UE includes an identifier of the UE, configuration information for a random access channel RACH used by the UE to access the access network device of the first network, and an encryption algorithm used by the UE to communicate with the access network device of the first network.

Figure 11:
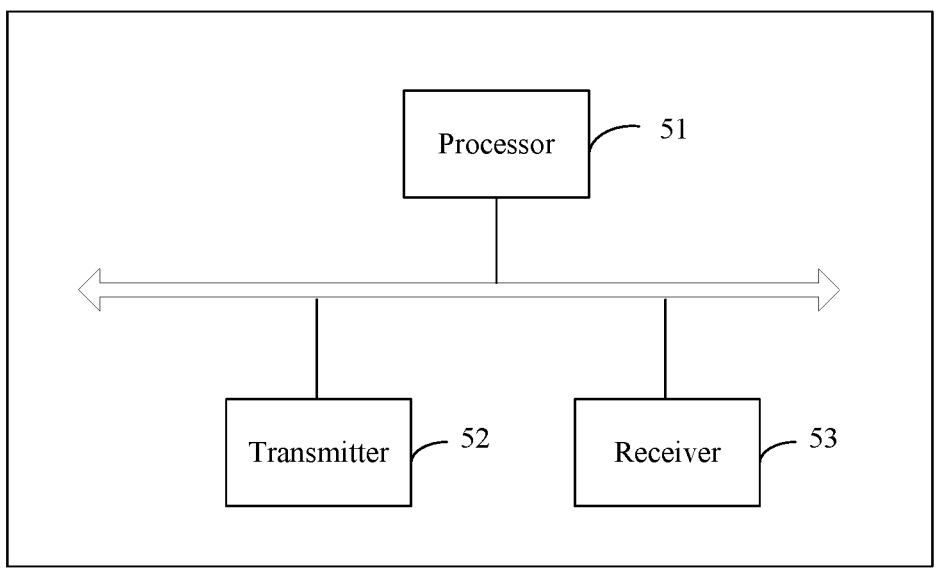
FIG. 11 is a schematic structural diagram of an access network device of a first network according to Embodiment 9 of the present disclosure.

FIG. 11 is a schematic structural diagram of an access network device of a first network according to Embodiment 9 of the present disclosure. As shown in FIG. 11, the access network device of the first network provided in this embodiment includes a processor 51 and a transmitter 52. The transmitter 52 is connected to and communicates with the processor 51 by using a communications bus.

The processor 51 is configured to determine an access network device of a second network as an anchor for data splitting.

The transmitter 52 is configured to send first splitting configuration information to UE. The first splitting configuration information is used to notify the UE that the access network device of the second network is to split to-be-split data of the UE.

The transmitter 52 is further configured to send second splitting configuration information to the access network device of the second network. The second splitting configuration information is used to instruct the access network device of the second network to split the to-be-split data of the UE.

Optionally, the first splitting configuration information includes a radio resource configuration of the to-be-split data, and the radio resource configuration of the to-be-split data includes an identifier of a to-be-split bearer and media access control (MAC) configuration information. The second splitting configuration information includes the identifier of the to-be-split bearer and an identifier of the UE.

Optionally, the second splitting configuration information further includes at least one of information that is about a first tunnel endpoint and that is allocated by the access network device of the first network and traffic control information. The information about the first tunnel endpoint is used to indicate a destination of downlink data transmission, and the traffic control information is used to indicate maximum traffic that the access network device of the first network can bear when the access network device of the second network is performing data splitting.

Optionally, the first splitting configuration information is further used to instruct the UE to access the access network device of the first network. The sending, by the access network device of the first network, first splitting configuration information to UE is specifically: sending, by the access network device of the first network, the first splitting configuration information to the UE by using the access network device of the second network. Accordingly, the first splitting configuration information further includes mobility control information of the UE in the access network device of the first network. The mobility control information of the UE includes the identifier of the UE, configuration information for a random access channel RACH used by the UE to access the access network device of the first network, and an encryption algorithm used by the UE to communicate with the access network device of the first network.

Optionally, the transmitter 52 is specifically configured to send a splitting command to the access network device of the second network. The splitting command includes the second splitting configuration information.

Optionally, the transmitter 52 is further configured to send a splitting request message to the access network device of the second network before sending the first splitting configuration information to the UE. The splitting request message includes an identifier of a selectable splitting bearer and the identifier of the UE, and the selectable splitting bearer includes at least the to-be-split bearer.

Optionally, the access network device of the first network further includes a receiver 53. The receiver 53 is connected to and communicates with the processor 51 by using the communications bus. The receiver 53 is configured to receive a splitting permission message sent by the access network device of the second network. The splitting permission message includes the identifier of the to-be-split bearer, and the to-be-split bearer is a bearer allowed to be split and determined by the access network device of the second network from the selectable splitting bearer. The transmitter 52 is specifically configured to send the first splitting configuration information to the UE based on the splitting permission message.

It should be noted that, alternatively, the transmitter 52 in this embodiment may be implemented by two independent physical transmitters: a first transmitter and a second transmitter. The first transmitter is configured to send data to the UE. The second transmitter is configured to send data to the access network device of the second network. When the first network is an LTE network and the second network is a new radio access network, the second transmitter externally presents an X5 interface. The X5 interface is an interface newly added between the access network device of the LTE network and the access network device of the new radio access network.

Figure 12:
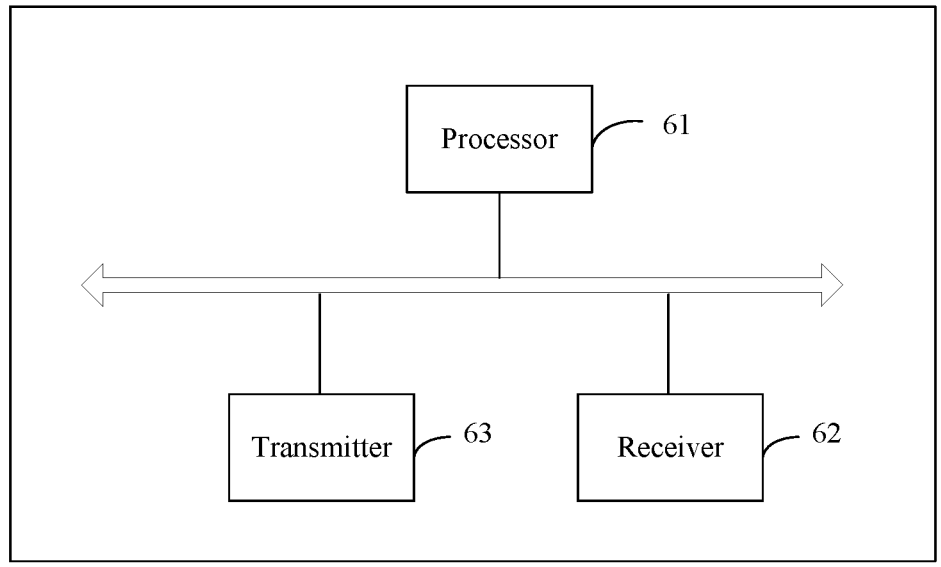
FIG. 12 is a schematic structural diagram of an access network device of a second network according to Embodiment 10 of the present disclosure.

FIG. 12 is a schematic structural diagram of an access network device of a second network according to Embodiment 10 of the present disclosure. As shown in FIG. 12, the access network device of the second network provided in this embodiment includes a processor 61 and a receiver 62. The receiver 62 is connected to and communicates with the processor 61 by using a communications bus.

The receiver 62 is configured to receive second splitting configuration information sent by an access network device of a first network. The second splitting configuration information is used to instruct the access network device of the second network to split to-be-split data of user equipment (UE).

The processor 61 is configured to split the to-be-split data of the UE based on the second splitting configuration information.

Optionally, the second splitting configuration information includes an identifier of a to-be-split bearer and an identifier of the UE.

Optionally, the second splitting configuration information further includes at least one of information that is about a first tunnel endpoint and that is allocated by the access network device of the first network and traffic control information. The information about the first tunnel endpoint is used to indicate a destination of downlink data transmission, and the traffic control information is used to indicate maximum traffic that the access network device of the first network can bear when the access network device of the second network is performing data splitting.

Optionally, the receiver 62 is specifically configured to receive a splitting command sent by the access network device of the first network. The splitting command includes the second splitting configuration information.

Optionally, the receiver 62 is specifically configured to receive a splitting request message sent by the access network device of the first network. The splitting request message includes an identifier of a selectable splitting bearer and the identifier of the UE, and the selectable splitting bearer includes at least the to-be-split bearer.

Optionally, the access network device of the second network further includes a transmitter 63. The transmitter 63 is connected to and communicates with the processor 61 by using the communications bus. The transmitter 63 is configured to send a splitting permission message to the access network device of the first network. The splitting permission message includes the identifier of the to-be-split bearer, and the to-be-split bearer is a bearer allowed to be split and determined by the access network device of the second network from the selectable splitting bearer.

Figure 13:
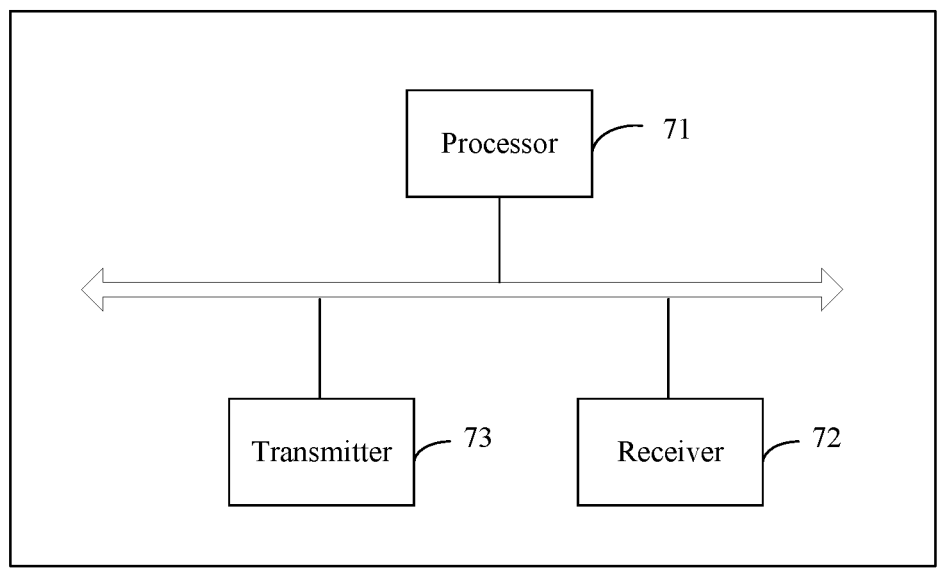
FIG. 13 is a schematic structural diagram of UE according to Embodiment 11 of the present disclosure.

FIG. 13 is a schematic structural diagram of UE according to Embodiment 11 of the present disclosure. As shown in FIG. 13, the UE provided in this embodiment includes a processor 71, a receiver 72, and a transmitter 73. The receiver 72 and the transmitter 73 are connected to and communicate with the processor 71 by using a communications bus.

The receiver 72 is configured to receive first splitting configuration information sent by an access network device of a first network. The first splitting configuration information is used to notify the UE that an access network device of the second network is to split to-be-split data of the UE.

The processor 71 is configured to control the receiver 72 to receive the to-be-split data based on the first splitting configuration information.

The processor 71 is further configured to control the transmitter 73 to send the to-be-split data based on the first splitting configuration information.

Optionally, the first splitting configuration information includes a radio resource configuration of the to-be-split data, and the radio resource configuration of the to-be-split data includes an identifier of a to-be-split bearer and media access control (MAC) configuration information.

Embodiment 12 of the present disclosure provides UE. A structure of the UE in this embodiment is the same as the structure of the UE shown in FIG. 13. For details, refer to FIG. 13. In this embodiment, the receiver 72 is configured to receive first splitting configuration information sent by an access network device of a first network. The first splitting configuration information is used to notify the UE that an access network device of the second network is to split to-be-split data of the UE and used to instruct the UE to access the access network device of the first network.

The processor 71 is configured to access the access network device of the first network based on the first splitting configuration information.

The receiver 72 is further configured to receive the to-be-split data based on the first splitting configuration information.

The transmitter 73 is configured to send the to-be-split data based on the first splitting configuration information after the UE accesses the access network device of the first network.

Optionally, the first splitting configuration information includes a radio resource configuration of the to-be-split data and mobility control information of the UE in the access network device of the first network. The radio resource configuration of the to-be-split data includes an identifier of a to-be-split bearer and media access control (MAC) configuration information. The mobility control information of the UE includes an identifier of the UE, configuration information for a random access channel RACH used by the UE to access the access network device of the first network, and an encryption algorithm used by the UE to communicate with the access network device of the first network.

Figure 14:
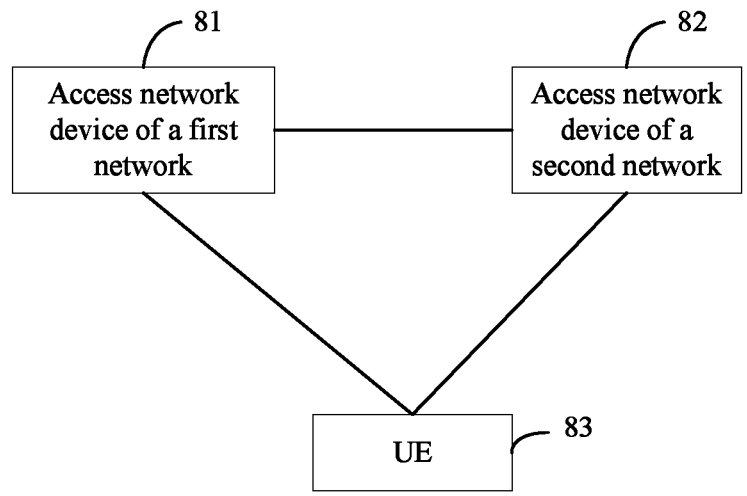
FIG. 14 is a schematic structural diagram of a communications system according to Embodiment 13 of the present disclosure.

FIG. 14 is a schematic structural diagram of a communications system according to Embodiment 13 of the present disclosure. As shown in FIG. 14, the communications system provided in this embodiment includes an access network device 81 of a first network, an access network device 82 of a second network, and UE 83. The access network device 81 of the first network, the access network device 82 of the second network, and the UE 83 may be configured to perform the methods in the foregoing embodiments. Their specific implementations and technical effects are similar, and are not described herein again.

Figure 15:
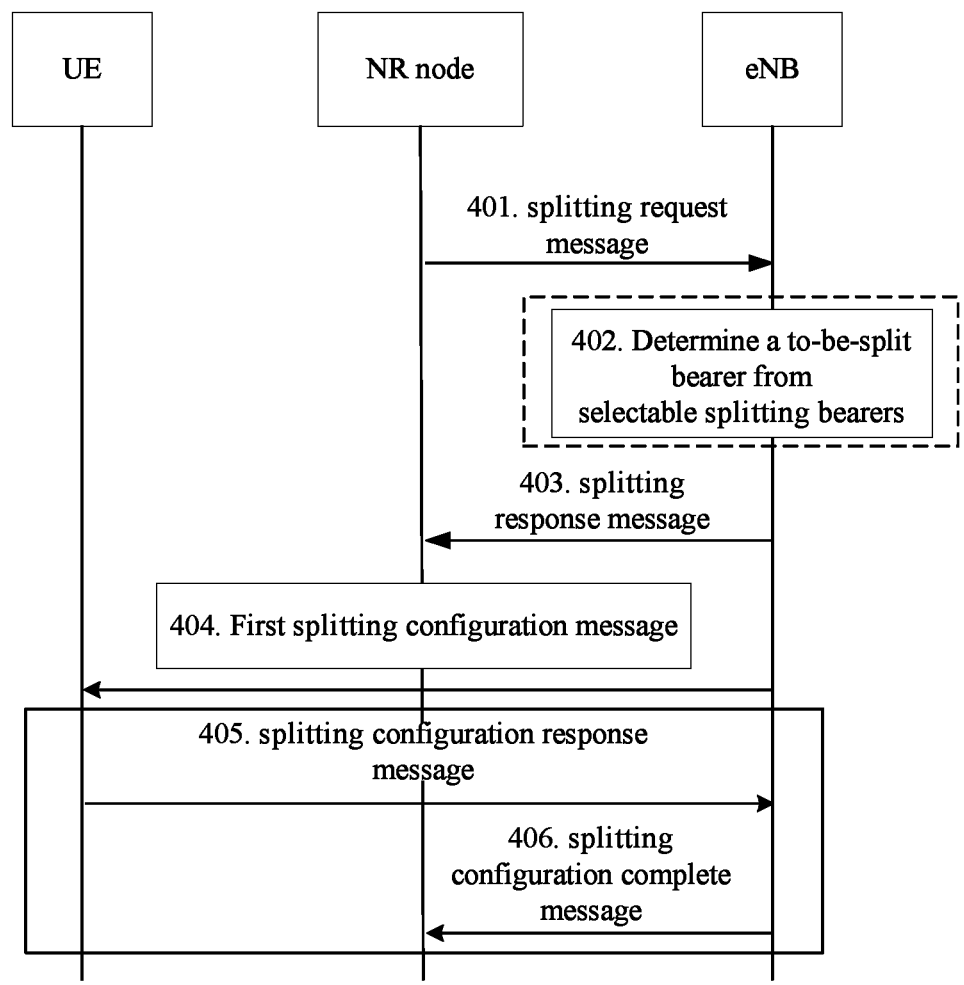
FIG. 15 is a flowchart of a multi-connectivity communication method according to Embodiment 14 of the present disclosure.

FIG. 15 is a flowchart of a multi-connectivity communication method according to Embodiment 14 of the present disclosure. This embodiment is described by using an example in which a first network is an LTE network and a second network is a new radio access network. An access network device of the first network is an eNB, and an access network device of the second network is an NR node. As shown in FIG. 15, the method provided in this embodiment includes the following steps.

Step 401: The NR node sends a splitting request message to the eNB.

The splitting request message is used to request to split to-be-split data of UE, and the splitting request message includes identifiers of selectable splitting bearers. Optionally, the splitting request message further includes one or more types of the following information: a splitting type, an identifier of the UE, QoS requirement information of the selectable splitting bearer, traffic control information, information about a second tunnel endpoint, report indication information of a throughput of the UE in the first network, and report indication information of a peak rate of the UE in the first network.

The traffic control information is used to indicate maximum traffic that the access network device of the first network can bear when the NR node is performing data splitting, thereby avoiding excessively large or small traffic being split. If the access network device of the second network splits an excessively large quantity of data to the access network device of the first network for transmission, a decrease in a throughput of an entire network is caused due to a relatively low transmission rate of the access network device of the first network. The report indication information of the throughput of the UE in the first network is used to instruct the access network device of the first network to report the throughput of the UE in the first network. The report indication information of the peak rate of the UE in the first network is used to instruct the access network device of the first network to report the peak rate of the UE in the first network. The throughput or the peak rate of the UE in the first network may be bearer-based or UE-based. The NR node may further determine, based on the throughput or the peak rate of the UE in the first network, an amount of data to be split to the eNB.

The information about the second tunnel endpoint is used to indicate a destination of uplink data transmission. The information about the second tunnel endpoint includes an identifier of the second tunnel endpoint and a second transport layer address. The information about the second tunnel endpoint is mainly used in a data forwarding scenario. To be specific, when not all downlink data that is split to the eNB is sent to the UE, the eNB may use the information about the second tunnel endpoint that is allocated by the NR node to send remaining downlink data to the NR node. A second tunnel endpoint and a to-be-split bearer are in a one-to-one correspondence.

Optionally, before this step, the NR node determines to split the data of the UE. Specifically, different from the foregoing embodiments, in this embodiment, because the NR node is to make a decision, the NR node needs to obtain decision-making information to make a decision. The decision-making information includes quality of an air interface of the NR node, a measurement result of the UE, load information of a base station, and the like. The measurement result of the UE includes a measurement result of the UE for the eNB and a measurement result of the UE for the NR node. The decision-making information needs to be obtained before decision-making. The eNB may exchange a measurement result by using a new message through an interface between the eNB and the NR node. This is not limited in the present disclosure.

Step 402: The eNB determines a to-be-split bearer from selectable splitting bearers.

The eNB may allow the NR node to split all of the requested selectable splitting bearers, or may allow the NR node to split only some of the requested selectable splitting bearers.

Step 402 is an optional step. If this step is not selected, the eNB considers by default that all bearers requested by the NR node can be split.

Step 403: The eNB sends a splitting response message to the NR node.

The splitting response message includes an identifier of the to-be-split bearer. If the eNB allows the NR node to split all the requested selectable splitting bearers, identifiers of to-be-split bearers included in the splitting response message are identifiers of all the selectable splitting bearers. If the eNB allows the NR node to split some of the requested selectable splitting bearers, identifiers of to-be-split bearers included in the splitting permission response message are identifiers of the bearers that are allowed to be split. There may be one or more to-be-split bearers. When the eNB allows the NR node to split some of the requested selectable splitting bearers, optionally, the splitting response message further includes an identifier of a bearer that is not allowed to be split. For the bearer that is not allowed to be split, the NR node performs transmission according to a normal transmission procedure. There may be one or more bearers that are not allowed to be split.

Optionally, the splitting response message further includes one or more types of the following information: information about a first tunnel endpoint, the measurement result of the UE, the splitting type, the throughput of the UE in the first network, and the peak rate of the UE in the first network. The information about the first tunnel endpoint is used to indicate a destination of downlink data transmission. The information about the first tunnel endpoint includes an identifier of the first tunnel endpoint and a first transport layer address. The information about the first tunnel endpoint is used to indicate the destination of the downlink data transmission. A first tunnel endpoint and a to-be-split bearer are in a one-to-one correspondence. The throughput and the peak rate of the UE in the first network are sent by the eNB based on the report indication information in the splitting response message. The throughput and the peak rate of the UE in the first network are mainly used by the NR node to determine an amount of data to be split to the eNB.

The measurement result of the UE is used by the NR node to make a splitting decision subsequently. The splitting type is a type newly defined in the present disclosure, and the splitting type is used to instruct the NR node to aggregate split data from the eNB and the UE. An existing splitting type includes a split bearer type and an SCG bearer type. The type newly defined in the present disclosure may be referred to as an SCG split bearer type. If the SCG split bearer type has been configured for the NR node, the SCG split bearer type does not need to be carried in the splitting response message.

Step 404: The eNB sends first splitting configuration information to UE.

The first splitting configuration information is used to notify the UE that the NR node is to split the to-be-split bearer. Optionally, the first splitting configuration information further includes one or more types of the following information: radio resource configuration information and mobility control information. The radio resource configuration information includes one or more types of the following information: a to-be-split bearer list, MAC configuration information, and the like. The to-be-split bearer list includes the identifier of the to-be-split bearer, and a splitting type corresponding to the to-be-split bearer. Different bearers may correspond to different splitting types. The mobility control information includes one or more types of the following information: the identifier of the UE, random access control configuration information, an encryption algorithm, and the like. The radio resource configuration information and the mobility control information are used when the UE accesses only the NR node without accessing the eNB before the NR node determines to perform splitting. In this case, the UE accesses the eNB based on the radio resource configuration information and the mobility control information.

The eNB may add the first splitting configuration information to an RRC reconfiguration message. Certainly, the eNB may alternatively add the first splitting configuration information to another existing message or a newly defined message. This is not limited in the present disclosure.

Step 405: The UE sends a configuration response message to the eNB.

After receiving the first splitting configuration information, the UE performs splitting configuration. Optionally, after completing the configuration, the UE may send a configuration response message to the eNB. The configuration response message may be an RRC reconfiguration complete message, and certainly, may alternatively be another message. Optionally, the UE may not send the configuration response message. After sending the first splitting configuration information for a period of time, the eNB considers by default that the UE has completed configuration.

Step 406: The eNB sends a splitting configuration complete message to the NR node.

After determining that the UE has completed the splitting configuration, the eNB sends the splitting configuration complete message to the NR node, to notify the NR node that the splitting configuration is completed and that splitting can start.

Step 406 is an optional step. If this step is omitted, it is considered by default that the NR node may start splitting after receiving the splitting response message sent by the eNB.

In this embodiment, the NR node determines to split the data of the UE, and then sends the splitting request message to the eNB. The splitting request message includes the identifier of the selectable splitting bearer. The eNB determines the to-be-split bearer from the selectable splitting bearer, and sends the to-be-split bearer to the NR node. Then, the eNB sends the first splitting configuration information to the UE. The first splitting configuration information is used to notify the UE that the NR node is to split the to-be-split bearer. After the UE completes the configuration, the eNB sends the splitting configuration complete message to the NR node. The NR node splits some data of the UE to the eNB for transmission, to improve transmission efficiency and increase a throughput.

Figure 16:
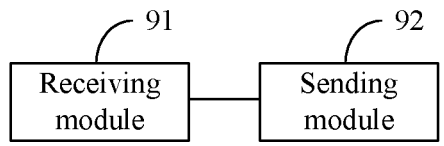
FIG. 16 is a schematic structural diagram of an access network device of a first network according to Embodiment 15 of the present disclosure.

FIG. 16 is a schematic structural diagram of an access network device of a first network according to Embodiment 15 of the present disclosure. As shown in FIG. 16, the access network device of the first network provided in this embodiment includes:

a receiving module 91, configured to receive a splitting request message sent by an access network device of a second network, where the splitting request message includes identifiers of selectable splitting bearers; and a sending module 92, configured to send a splitting response message to the access network device of the second network, where the splitting response message includes an identifier of the to-be-split bearer, and the to-be-split bearer is some or all of the selectable splitting bearers.

The sending module 92 is further configured to send first splitting configuration information to UE. The first splitting configuration information is used to notify the UE that the access network device of the second network is to split the to-be-split bearer, and the first splitting configuration information includes the identifier of the to-be-split bearer.

Optionally, the sending module 92 is specifically configured to send a radio resource control (RRC) reconfiguration message to the UE. The RRC reconfiguration message includes the first splitting configuration information.

Optionally, the sending module 92 is further configured to send a splitting configuration complete message to the access network device of the second network.

Figure 17:
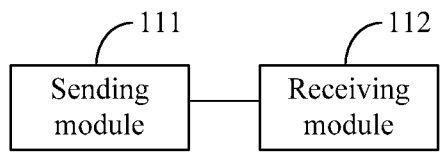
FIG. 17 is a schematic structural diagram of an access network device of a second network according to Embodiment 16 of the present disclosure.

FIG. 17 is a schematic structural diagram of an access network device of a second network according to Embodiment 16 of the present disclosure. As shown in FIG. 17, the access network device of the second network provided in this embodiment includes:

a sending module 111, configured to send a splitting request message to an access network device of a first network, where the splitting request message includes identifiers of selectable splitting bearers; and a receiving module 112, configured to receive a splitting response message sent by the access network device of the first network, where the splitting response message includes an identifier of a to-be-split bearer, and the to-be-split bearer is some or all of the selectable splitting bearers.

Optionally, the receiving module 112 is further configured to receive a splitting configuration complete message sent by the access network device of the first network.

Embodiment 17 of the present disclosure provides UE. In this embodiment, the UE includes a receiving module. The receiving module is configured to receive first splitting configuration information sent by an access network device of a first network. The first splitting configuration information is used to notify the UE that an access network device of a second network is to split a to-be-split bearer, and the first splitting configuration information includes an identifier of the to-be-split bearer.

Embodiment 18 of the present disclosure provides an access network device of a first network. A structure of the access network device of the first network in this embodiment is the same as a structure of the access network device of the first network shown in FIG. 11. As shown in FIG. 11, in this embodiment:

The processor 51 is configured to control the receiver 53 to receive a splitting request message sent by an access network device of a second network. The splitting request message includes identifiers of selectable splitting bearers.

The processor 51 is further configured to control the transmitter 52 to send a splitting response message to the access network device of the second network. The splitting response message includes an identifier of the to-be-split bearer, and the to-be-split bearer is some or all of the selectable splitting bearers.

The processor 51 is further configured to control the transmitter 52 to send first splitting configuration information to user equipment (UE). The first splitting configuration information is used to notify the UE that the access network device of the second network is to split the to-be-split bearer, and the first splitting configuration information includes the identifier of the to-be-split bearer.

Optionally, the transmitter 52 is specifically configured to send a radio resource control (RRC) reconfiguration message to the UE. The RRC reconfiguration message includes the first splitting configuration information.

Optionally, the processor 51 is further configured to control the transmitter to send a splitting configuration complete message to the access network device of the second network.

Embodiment 19 of the present disclosure provides an access network device of a second network. A structure of the access network device of the second network in this embodiment is the same as a structure of the access network device of the second network shown in FIG. 12. As shown in FIG. 12, in this embodiment:

The processor 61 is configured to control the transmitter 63 to send a splitting request message to an access network device of a first network. The splitting request message includes identifiers of selectable splitting bearers.

The processor 61 is further configured to control the receiver 62 to receive a splitting response message sent by the access network device of the first network. The splitting response message includes an identifier of a to-be-split bearer, and the to-be-split bearer is some or all of the selectable splitting bearers.

Optionally, the processor 61 is further configured to control the receiver 62 to receive a splitting configuration complete message sent by the access network device of the first network.

Figure 18:
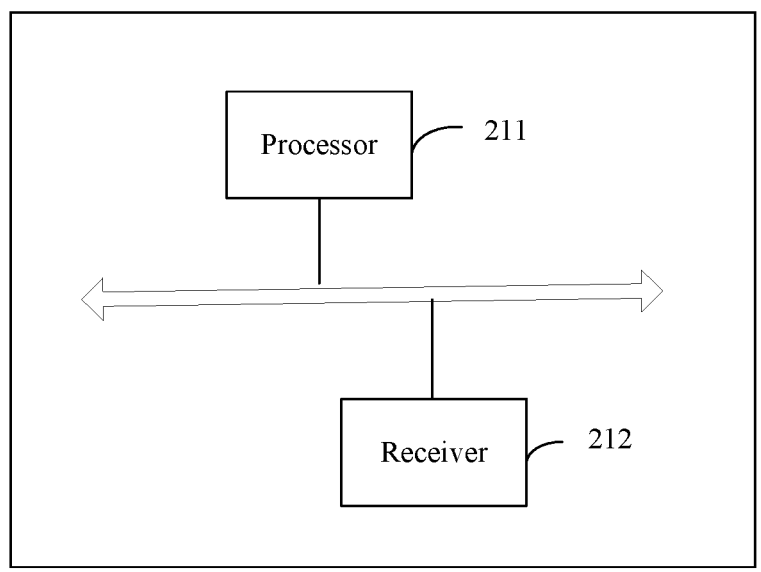
FIG. 18 is a schematic structural diagram of UE according to Embodiment 20 of the present disclosure.

FIG. 18 is a schematic structural diagram of UE according to Embodiment 20 of the present disclosure. As shown in FIG. 18, in this embodiment, the UE includes a processor 211 and a receiver 212.

The processor 211 is configured to control the receiver 212 to receive first splitting configuration information sent by an access network device of a first network. The first splitting configuration information is used to notify the UE that an access network device of a second network is to split a to-be-split bearer, and the first splitting configuration information includes an identifier of the to-be-split bearer.

It should be noted that, in Embodiment 15 to Embodiment 20 of the present disclosure, the splitting request message further includes one or more types of the following information: a splitting type, an identifier of the UE, quality of service (QoS) requirement information of the selectable splitting bearer, traffic control information, information about a second tunnel endpoint, report indication information of a throughput of the UE in the first network, and report indication information of a peak rate of the UE in the first network. The traffic control information is used to indicate maximum traffic that the access network device of the first network can bear when the access network device of the second network is performing data splitting, and the information about the second tunnel endpoint is used to indicate a destination of uplink data transmission.

In Embodiment 15 to Embodiment 20 of the present disclosure, the splitting response message further includes one or more types of the following information: information about a first tunnel endpoint, a measurement result of the UE, the splitting type, the throughput of the UE in the first network, and the peak rate of the UE in the first network. The information about the first tunnel endpoint is used to indicate a destination of downlink data transmission.

In Embodiment 15 to Embodiment 20 of the present disclosure, the first splitting configuration information further includes one or more types of the following information: MAC configuration information and a splitting type.

In addition, for specific implementations of Embodiment 15 to Embodiment 20 of the present disclosure, refer to related descriptions in Embodiment 14. Details are not described herein again.

In the several embodiments provided in the present disclosure, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) or a processor to perform a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A multi-connectivity communication method, comprising:

receiving, by an access network device of a second network, second splitting configuration information from an access network device of a first network, wherein the second splitting configuration information indicates the access network device of the second network to split to-be-split data of user equipment (UE); and splitting, by the access network device of the second network at a packet data convergence protocol (PDCP) layer, the to-be-split data of the UE based on the second splitting configuration information.

2. The method according to claim 1, wherein the second splitting configuration information comprises an identifier of a to-be-split bearer and an identifier of the UE.

3. The method according to claim 2, wherein the second splitting configuration information further comprises at least one of information that is about a first tunnel endpoint and that is allocated by the access network device of the first network and traffic control information, wherein the information about the first tunnel endpoint indicates a destination of downlink data transmission, and the traffic control information indicates maximum traffic that the access network device of the first network can bear when the access network device of the second network is performing data splitting.

4. The method according to claim 2, wherein the method further comprises:
sending, by the access network device of the second network, a splitting permission message to the access network device of the first network, wherein the splitting permission message comprises the identifier of the to-be-split bearer and a second tunnel endpoint, and the second tunnel endpoint is used to indicate a destination of uplink data transmission.

5. The method according to claim 1, wherein the receiving, by an access network device of a second network, second splitting configuration information from an access network device of a first network comprises:
receiving, by the access network device of the second network, a splitting command from the access network device of the first network, wherein the splitting command comprises the second splitting configuration information.

6. The method according to claim 1, wherein a control plane connection is established between the access network device of the first network and a core network, no control plane connection is established between the access network device of the second network and the core network, and a user plane connection is established between the access network device of the second network and the core network; and
control plane data is transmitted in the first network, and user plane data is transmitted in the first network and the second network.

7. The method according to claim 1, wherein the first network is a long term evolution (LTE) network and the second network is a new radio (NR) network.

8. An access network device of a second network, comprising:
a receiver, configured to receive second splitting configuration information from an access network device of a first network, wherein the second splitting configuration information indicates the access network device of the second network to split to-be-split data of user equipment (UE); and
a processor, configured to split the to-be-split data of the UE at a packet data convergence protocol (PDCP) layer based on the second splitting configuration information.

9. The device according to claim 8, wherein the second splitting configuration information comprises an identifier of a to-be-split bearer and an identifier of the UE.

10. The device according to claim 9, wherein the second splitting configuration information further comprises at least one of information that is about a first tunnel endpoint and that is allocated by the access network device of the first network and traffic control information, wherein the information about the first tunnel endpoint indicates a destination of downlink data transmission, and the traffic control information indicates maximum traffic that the access network device of the first network can bear when the access network device of the second network is performing data splitting.

11. The device according to claim 9, wherein the receiver is configured to:
receive a splitting request message from the access network device of the first network, wherein the splitting request message comprises an identifier of a selectable splitting bearer and the identifier of the UE, and the selectable splitting bearer comprises at least the to-be-split bearer; and
the access network device of the second network further comprises:
a transmitter, configured to send a splitting permission message to the access network device of the first network, wherein the splitting permission message comprises the identifier of the to-be-split bearer, and the to-be-split bearer is a bearer allowed to be split and determined by the access network device of the second network from the selectable splitting bearer.

12. The device according to claim 9, wherein the access network device of the second network further comprises:
a transmitter, configured to send a splitting permission message to the access network device of the first network, wherein the splitting permission message comprises the identifier of the to-be-split bearer and a second tunnel endpoint, wherein the second tunnel endpoint is used to indicate a destination of uplink data transmission.

13. The device according to claim 8 wherein the receiver is configured to:
receive a splitting command from the access network device of the first network, wherein the splitting command comprises the second splitting configuration information.

14. The device according to claim 8, wherein a control plane connection is established between the access network device of the first network and a core network, no control plane connection is established between the access network device of the second network and the core network, and a user plane connection is established between the access network device of the second network and the core network; and
control plane data is transmitted in the first network, and user plane data is transmitted in the first network and the second network.

15. The device according to claim 8, wherein the first network is a long term evolution (LTE) network and the second network is a new radio (NR) network.

16. A multi-connectivity communication method, comprising:
sending, by an access network device of a second network, a splitting request message to an access network device of a first network, wherein the splitting request message comprises identifiers of selectable splitting bearers;
receiving, by the access network device of the second network, a splitting response message from the access network device of the first network, wherein the splitting response message comprises an identifier of a to-be-split bearer, and the to-be-split bearer is some or all of the selectable splitting bearers; and splitting, by the access network device of the second network at a packet data convergence protocol (PDCP) layer, the to-be-split bearer.

17. The method according to claim 16, wherein the splitting request message further comprises one or more types of the following information: a splitting type, an identifier of user equipment (UE), quality of service (QoS) requirement information of the selectable splitting bearer, traffic control information, information about a second tunnel endpoint, report indication information of a throughput of the UE in the first network, and report indication information of a peak rate of the UE in the first network, wherein the traffic control information is used to indicate maximum traffic that the access network device of the first network can bear when the access network device of the second network is performing data splitting, and the information about the second tunnel endpoint indicates a destination of uplink data transmission.

18. The method according to claim 17, wherein the splitting response message further comprises one or more types of the following information: information about a first tunnel endpoint, a measurement result of the UE, the splitting type, and the throughput and the peak rate of the UE in the first network, wherein the information about the first tunnel endpoint is used to indicate a destination of downlink data transmission.

19. The method according to claim 16, after the receiving, by the access network device of the second network, a splitting response message from the access network device of the first network, further comprising:
receiving, by the access network device of the second network, a splitting configuration complete message from the access network device of the first network.

20. The method according to claim 16, wherein a control plane connection is established between the access network device of the first network and a core network, no control plane connection is established between the access network device of the second network and the core network, and a user plane connection is established between the access network device of the second network and the core network; and
control plane data is transmitted in the first network, and user plane data is transmitted in the first network and the second network.

21. The method according to claim 16, wherein the first network is a long term evolution (LTE) network and the second network is a new radio (NR) network.

22. An access network device of a second network, comprising a receiver, a transmitter, and a processor, wherein
the processor is configured to control the transmitter to send a splitting request message to an access network device of a first network, wherein the splitting request message comprises identifiers of selectable splitting bearers;
the processor is further configured to control the receiver to receive a splitting response message from the access network device of the first network, wherein the splitting response message comprises an identifier of a to-be-split bearer, and the to-be-split bearer is some or all of the selectable splitting bearers; and
the processor is further configured to control the device to split the to-be-split bearer at a packet data convergence protocol (PDCP) layer.

23. The device according to claim 22, wherein the splitting request message further comprises one or more types of the following information: a splitting type, an identifier of user equipment (UE), quality of service (QoS) requirement information of the selectable splitting bearer, traffic control information, information about a second tunnel endpoint, report indication information of a throughput of the UE in the first network, and report indication information of a peak rate of the UE in the first network, wherein the traffic control information is used to indicate maximum traffic that the access network device of the first network can bear when the access network device of the second network is performing data splitting, and the information about the second tunnel endpoint indicates a destination of uplink data transmission.

24. The device according to claim 23, wherein the splitting response message further comprises one or more types of the following information: information about a first tunnel endpoint, a measurement result of the UE, the splitting type, and the throughput and the peak rate of the UE in the first network, wherein the information about the first tunnel endpoint is used to indicate a destination of downlink data transmission.

25. The device according to claim 22, wherein the processor is further configured to:
control the receiver to receive a splitting configuration complete message from the access network device of the first network.

26. The device according to claim 22, wherein a control plane connection is established between the access network device of the first network and a core network, no control plane connection is established between the access network device of the second network and the core network, and a user plane connection is established between the access network device of the second network and the core network; and
control plane data is transmitted in the first network, and user plane data is transmitted in the first network and the second network.

27. The device according to claim 22, wherein the first network is a long term evolution (LTE) network and the second network is a new radio (NR) network.

* * * * *